United States Patent
Lim et al.

(10) Patent No.: US 9,933,188 B2
(45) Date of Patent: Apr. 3, 2018

(54) REFRIGERATOR AND CONTROL METHOD THEREOF

(71) Applicant: LG ELECTRONICS INC., Seoul (KR)

(72) Inventors: Hyoungkeun Lim, Seoul (KR); Sangbong Lee, Seoul (KR); Jangseok Lee, Seoul (KR); Myungjin Chung, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 421 days.

(21) Appl. No.: 14/453,324

(22) Filed: Aug. 6, 2014

(65) Prior Publication Data

US 2015/0040591 A1 Feb. 12, 2015

(30) Foreign Application Priority Data

Aug. 6, 2013 (KR) .................. 10-2013-0093156
Aug. 6, 2013 (KR) .................. 10-2013-0093157
Jul. 8, 2014 (KR) .................. 10-2014-0085253

(51) Int. Cl.
*F25B 5/02* (2006.01)
*F25B 49/02* (2006.01)
(Continued)

(52) U.S. Cl.
CPC .............. *F25B 5/02* (2013.01); *F25B 41/062* (2013.01); *F25B 49/02* (2013.01); *F25D 11/022* (2013.01);
(Continued)

(58) Field of Classification Search
CPC .... F25B 5/02; F25B 49/02; F25B 1/10; F25B 2600/022; F25B 2600/2511; F25B 2600/21; F25B 2600/112; F25D 11/022
See application file for complete search history.

(56) References Cited

U.S. PATENT DOCUMENTS 6,327,867 B1 * 12/2001 Hyodo .................. F25B 5/04
62/187
6,491,063 B1 * 12/2002 Benatav ............... F25B 41/046
137/625.43
(Continued)

FOREIGN PATENT DOCUMENTS

CN 1375673 A 10/2002
EP 1 243 880 A1 9/2002
(Continued)

OTHER PUBLICATIONS

Korean Office Action dated Mar. 21, 2016 issued in Application No. 10-2014-0085253.
(Continued)

*Primary Examiner* — Keith Raymond
*Assistant Examiner* — Lionel Nouketcha
(74) *Attorney, Agent, or Firm* — Ked & Associates, LLP

(57) ABSTRACT

Provided are a refrigerator and a control method thereof. The refrigerator includes a compressor, a condenser, a refrigerant tube guiding a flow of the refrigerant condensed in the condenser, a plurality of expansion devices, a plurality of evaporators including first and second evaporators to evaporate the refrigerant decompressed in the plurality of expansion devices, a plurality of first evaporation passages in which a portion of the plurality of expansion devices is disposed, the plurality of first evaporation passages guiding introduction of the refrigerant into the first evaporator of the plurality of evaporators, a second evaporation passage in which the other portion of the plurality of expansion devices is disposed, the second evaporation passage guiding introduction of the refrigerant into the second evaporator and a flow adjusting unit to branch the refrigerant into the plurality of first evaporation passages and the second evaporation passage.

7 Claims, 21 Drawing Sheets

(51) Int. Cl.
*F25B 41/06* (2006.01)
*F25D 11/02* (2006.01)
*F25B 1/10* (2006.01)

(52) U.S. Cl.
CPC ......... *F25B 1/10* (2013.01); *F25B 2341/0661* (2013.01); *F25B 2600/112* (2013.01); *F25B 2600/21* (2013.01); *F25B 2600/2511* (2013.01); *Y02B 30/743* (2013.01); *Y02B 40/32* (2013.01)

(56) References Cited

U.S. PATENT DOCUMENTS

| | | |
|---|---|---|
| 2002/0069654 A1 | 6/2002 | Doi et al. |
| 2002/0134095 A1* | 9/2002 | Temmyo .................. F25B 5/02 62/179 |
| 2005/0132733 A1* | 6/2005 | Rafalovich ............. F25D 29/00 62/199 |
| 2012/0023975 A1 | 2/2012 | Yoon et al. |
| 2012/0080179 A1 | 4/2012 | Mercer et al. |
| 2012/0312034 A1* | 12/2012 | Oh ............................ F25B 1/10 62/84 |
| 2013/0186129 A1* | 7/2013 | Bae ........................ F25D 11/00 62/498 |

FOREIGN PATENT DOCUMENTS

| | | |
|---|---|---|
| EP | 2 413 068 A2 | 2/2012 |
| JP | 2011-12885 A | 1/2011 |
| KR | 10-2012-0011278 A | 2/2012 |
| KR | 10-2013-0071125 A | 6/2013 |
| KR | 10-2013-0096964 | 9/2013 |
| KR | 10-2008-0103851 | 10/2013 |

OTHER PUBLICATIONS

Chinese Office Action dated Mar. 31, 2016 issued in Application No. 201410383742.7.
European Search Report issued in Application No. 14179672.2 dated Feb. 27, 2015.
Korean Office Action dated Oct. 27, 2015 issued in Application No. 10-2014-0085253.

* cited by examiner

REFRIGERATOR AND CONTROL METHOD THEREOF

CROSS-REFERENCE TO RELATED APPLICATIONS

The present application claims priority under 35 U.S.C. 119 and 35 U.S.C. 365 to Korean Patent Application Nos. 10-2013-0093156 filed on Aug. 6, 2013, 10-2013-0093157 filed on Aug. 6, 2013, and 10-2014-0085253 filed on Jul. 8, 2014, whose entire disclosures are hereby incorporated by reference.

BACKGROUND

1. Field

The present disclosure relates to a refrigerator and a control method thereof.

2. Background

Refrigerators and methods of controlling the same are known. However, they suffer from various disadvantages.

BRIEF DESCRIPTION OF THE DRAWINGS

The embodiments will be described in detail with reference to the following drawings in which like reference numerals refer to like elements wherein.

DETAILED DESCRIPTION

Figure 1:
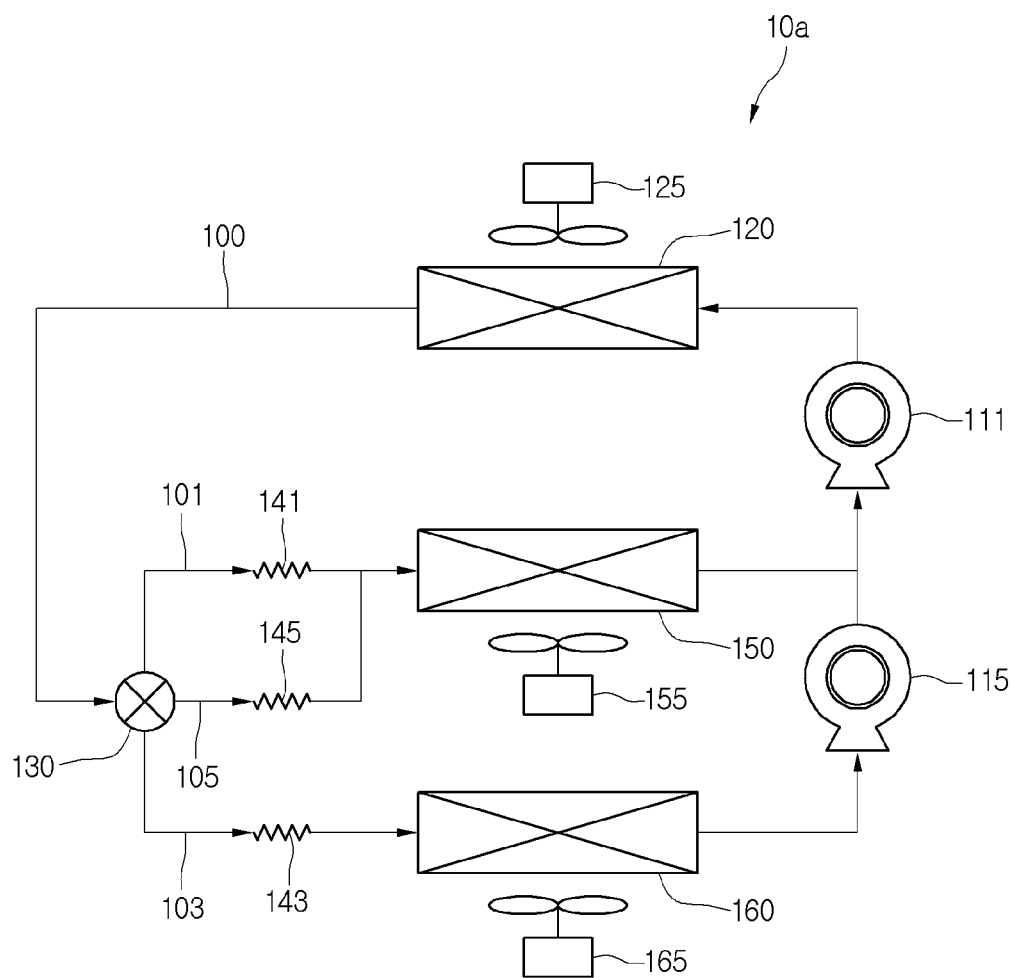
FIG. 1 is a view illustrating a system having a refrigeration cycle in a refrigerator according to a first embodiment.

Hereinafter, exemplary embodiments will be described with reference to the accompanying drawings. The invention may, however, be embodied in many different forms and should not be construed as being limited to the embodiments set forth herein; rather, that alternate embodiments included in other retrogressive inventions or falling within the spirit and scope of the present disclosure will fully convey the concept of the invention to those skilled in the art.

In general, a refrigerator has a plurality of storage compartments for accommodating foods to be stored so as to store the foods in a frozen or refrigerated state. Also, one surface of the storage compartment may be opened to accommodate or dispense the foods. The plurality of storage compartments may include a freezing compartment for storing foods in the frozen state and a refrigerating compartment for storing foods in the refrigerated state.

A refrigeration system in which a refrigerant is circulated is driven in the refrigerator. The refrigeration system may include a compressor, a condenser, an expansion device, and an evaporator. The evaporator may include a first evaporator disposed at a side of the refrigerating compartment and a second evaporator disposed at a side of the freezing compartment.

Cool air stored in the refrigerating compartment may be cooled while passing through the first evaporator, and the cooled cool air may be supplied again into the refrigerating compartment. Also, the cool air stored in the freezing compartment may be cooled while passing through the second evaporator, and the cooled cool air may be supplied again into the freezing compartment.

As described above, refrigerators are generally configured to independently cool the plurality of storage compartments through separate evaporators. For example, the refrigeration system may include a compressor, a condenser, a refrigerant supply unit, expansion devices, a first evaporator, and a second evaporator. The first and second evaporators may be understood as heat exchangers that are respectively provided to cool separate storage compartments.

The refrigerant supply unit may be provided as a three-way valve. A refrigerant introduced into the refrigerant supply unit may be guided to the first or second evaporator. That is, in the above described refrigerator, the refrigerant may be selectively supplied into the first or second evaporator to cool one storage compartment of the plurality of storage compartments and stop cooling of the other storage compartment. Here, the plurality of storage compartments may not be cooled at the same time, but must be selectively or alternately cooled.

In this case, although the storage compartment in which the cooling is performed is maintained to an adequate temperature, the storage compartment in which the cooling is not performed may increase in temperature, and thus, may fall outside optimal temperature range.

Also, in a state where the cooling of one storage compartment is required, if it is determined that the other storage compartment is outside the normal temperature range, the other storage compartment may be not immediately cooled. As a result, in the structure in which the storage compartments are independently cooled, the cool air may not be supplied at a suitable time and location, and hence, deteriorating the operation efficiency of the refrigerator.

Also, if both outlet sides of the refrigerant supply unit are opened to cool the plurality of storage compartments at the same time, the refrigerant may be concentrated into one evaporator of the plurality of evaporators.

Particularly, when the three-way valve is used as the refrigerant supply unit, it may be difficult to maintain physical equilibrium in the three-way valve. As a result, a relatively large amount of refrigerant may be introduced into one evaporator, and a relatively small amount of refrigerant may be introduced into the other evaporator.

Accordingly, provided is a refrigerator and a method of controlling the same that obviate such disadvantages.

FIG. 1 is a view illustrating a system having a refrigeration cycle in a refrigerator according to a first embodiment. A refrigerator 10a may include a plurality of devices for driving a refrigeration cycle. In detail, the refrigerator 10a may include a plurality of compressors 111 and 115 for compressing a refrigerant, a condenser 120 for condensing the refrigerant compressed in the plurality of compressors 111 and 115, a plurality of expansion devices 141, 143, and 145 for decompressing the refrigerant condensed in the condenser 120, and a plurality of evaporators 150 and 160 for evaporating the refrigerant decompressed in the plurality of expansion devices 141, 143, and 145.

Also, the refrigerator 10a may include a refrigerant tube 100 connecting the plurality of compressors 111 and 115, the condenser 120, the expansion devices 141, 143, and 145, and the evaporators 150 and 160 to each other to guide a flow of the refrigerant.

The plurality of compressors 111 and 115 may include a second compressor 115 disposed at a low-pressure side and a first compressor 111 for further compressing the refrigerant compressed in the second compressor 115. The first compressor 111 and the second compressor 115 may be connected to each other in series. That is, an outlet-side refrigerant tube of the second compressor 115 may be connected to an inlet-side of the first compressor 111.

The plurality of evaporators 150 and 160 may include a first evaporator 150 for generating cool air to be supplied into one storage compartment among a refrigerating compartment and a freezing compartment and a second evaporator 160 for generating cool air to be supplied into the other storage compartment.

For example, the first evaporator 150 may function as a "refrigerating compartment-side evaporator" to generate cool air to be supplied into the refrigerating compartment and be disposed on one side of the refrigerating compartment. Also, the second evaporator 160 may function as a "freezing compartment-side evaporator" to generate cool air to be supplied into the freezing compartment and be disposed on one side of the freezing compartment.

The cool air to be supplied into the freezing compartment may have a temperature less than that of the cool air to be supplied into the refrigerating compartment. Thus, a refrigerant evaporation pressure of the second evaporator 160 may be less than that of the first evaporator 150.

An outlet-side refrigerant tube 100 of the second evaporator 160 may extend to an inlet-side of the second compressor 115. Thus, the refrigerant passing through the second evaporator 160 may be introduced into the second compressor 115.

The outlet-side refrigerant tube 100 of the first evaporator 150 may be connected to the outlet-side refrigerant tube of the second compressor 115. Thus, the refrigerant passing through the first evaporator 150 may be mixed with the refrigerant compressed in the second compressor 115, and then the mixture may be suctioned into the first compressor 111.

The plurality of expansion devices 141, 143, and 145 may include first and third expansion devices 141 and 145 for expanding the refrigerant to be introduced into the first evaporator 150 and a second expansion device 143 for expanding the refrigerant to be introduced into the second evaporator 160. Each of the first to third expansion devices 141, 143, and 145 may include a capillary tube. The capillary tube of the second expansion device 143 may have a diameter less than that of the capillary tube of each of the first and third expansion devices 141 and 145 so that a refrigerant evaporation pressure of the second evaporator 160 is less than that of the first evaporator 150.

A plurality of refrigerant passages 101 and 105 for guiding the introduction of the refrigerant into the first evaporator 150 may be defined in the inlet-side of the first evaporator 150. The plurality of refrigerant passages 101 and 105 may include a first refrigerant passage 101 in which the first expansion device 141 is disposed and a third refrigerant passage 105 in which the third expansion device 145 is disposed. The first and third refrigerant passages 101 and 105 may be called a "first evaporation passage" in that the first and third refrigerant passages 101 and 105 guide the introduction of the refrigerant into the first evaporator 150. The refrigerant flowing into the first and third refrigerant passages 101 and 105 may be mixed with each other, and then introduced into the first evaporator 150.

Also, one refrigerant passage 103 for guiding the refrigerant into the second evaporator 160 is defined in the inlet-side of the second evaporator 160. The one refrigerant passage 103 may include the second refrigerant passage 103 in which the second expansion device 143 is disposed. The second refrigerant passage 103 may be called a "second evaporation passage" in that the second refrigerant passage 103 guides the refrigerant into the second evaporator 160. The first to third refrigerant passages 101, 103, and 105 may be understood as "branch passages" that are branched from the refrigerant tube 100.

The refrigerator 10a may further include a flow adjusting unit 130 for branching and introducing the refrigerant into the first to third refrigerant passages 101, 103, and 105. The flow adjusting unit 130 may be understood as a device for operating the first and second evaporators 150 and 160 at the same time, i.e., for adjusting a flow of the refrigerant so that the refrigerant is introduced into the first and second evaporators at the same time.

The flow adjusting unit 130 may include a four-way valve having one inflow hole through which the refrigerant is introduced and three discharge holes through which the refrigerant is discharged. The three discharge parts (or ports) of the flow adjusting unit 130 may be connected to the first to third refrigerant passages 101, 103, and 105, respectively. Thus, the refrigerant passing through the flow adjusting unit 130 may be branched and discharged into the first to third refrigerant passages 101, 103, and 105. The discharge parts connected to the first to third refrigerant passages 101, 103, and 105 may be called a "first discharge part", a "second discharge part", and a "third discharge part" respectively.

At least one discharge part of the first to third discharge parts may be opened. When all of the first to third discharge parts are opened, the refrigerant may flow through the first to third refrigerant passages 101, 103, and 105. On the other hand, when the first and second discharge parts are opened and the third discharge part is closed, the refrigerant may flow through the first and second refrigerant passages 101 and 103.

As described above, a flow path of the refrigerant may vary according to the control of the flow adjusting unit 130. Also, the control of the flow adjusting unit 130 may be performed on the basis of whether the refrigerant within the first or second evaporator 150 or 160 is greater or less than a prescribed amount.

For example, when the first and second evaporators 150 and 160 operate at the same time, if the refrigerant within the first evaporator 150 is relatively low, the flow adjusting unit 130 may be controlled so that the refrigerant flows into the first to third refrigerant passages 101, 103, and 105. On the other hand, if the refrigerant within the second evaporator 160 is relatively low, the third refrigerant passage 105 may be closed, and the flow adjusting unit 130 may be controlled so that the refrigerant flows into the first and second refrigerant passages 101 and 103.

That is, the flow passages 101 and 105 of the refrigerant to be introduced into the first evaporator 150 may be provided in plurality, and the flow of the refrigerant may be selectively controlled through the plurality of flow passages 101 and 105 to adjust an amount of refrigerant to be introduced into the first or second evaporator 150 or 160.

Since a greater amount of refrigerant flows into the inlet-side of the first evaporator 150 than the inlet-side of the second evaporator 160, when all of the first to third refrigerant passages 101, 103, and 105 are opened, a relatively large amount of refrigerant may flow into the first evaporator 150 compared to the second evaporator 160.

Here, heat-exchange performance of the first evaporator 150 may be greater than that of the second evaporator 160. Thus, when the first evaporator 150 corresponds to the refrigerating compartment-side evaporator and the second evaporator 160 corresponds to the freezing compartment-side evaporator, a cooling load or capacity of the refrigerating compartment may be greater than that of the freezing compartment.

The refrigerator 10a may include blower fans 125, 155, and 165 provided on one side of the heat exchanger to blow air. The blower fans 125, 155, and 165 may include a condensation fan 125 provided on one side of the condenser 120, a first evaporation fan 155 provided on one side of the first evaporator 150, and a second evaporation fan 165 provided on one side of the second evaporator 160.

Heat-exchange performance of the first and second evaporators 150 and 160 may vary according to a rotation rate of each of the first evaporation fans 155 and 165. For example, if a large amount of refrigerant is required according to the operation of the evaporator 150, the first evaporation fan 155 may increase in rotation rate. Also, if cool air is sufficient, the first evaporation fan 155 may be reduced in rotation rate.

Figure 2:
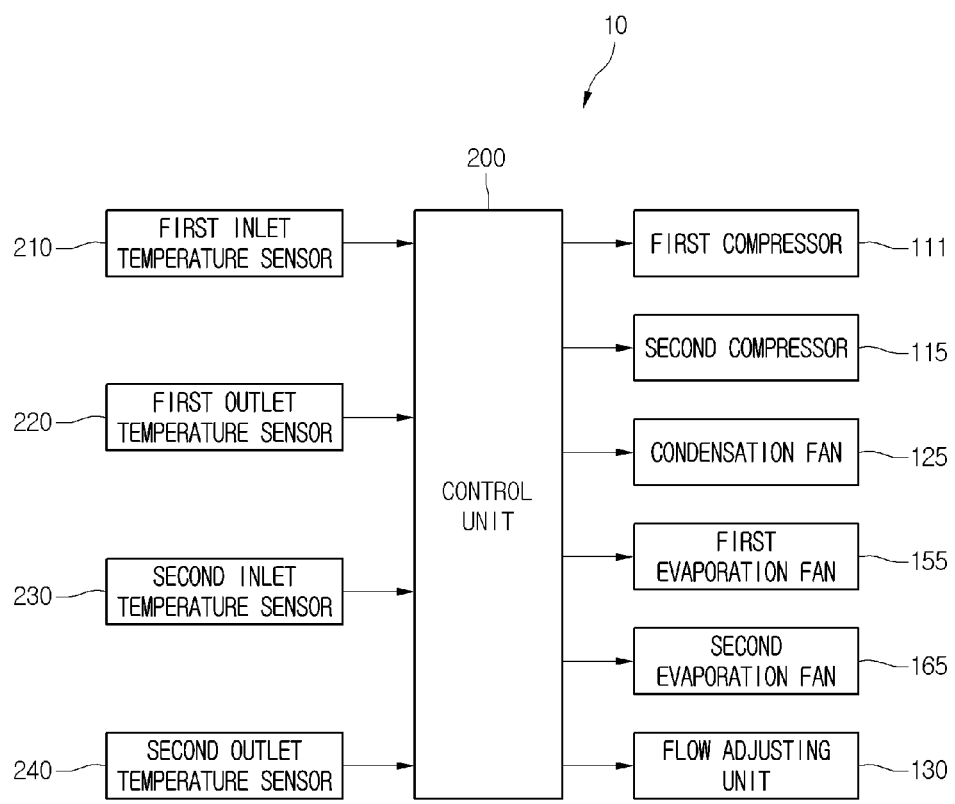
FIG. 2 is a block diagram of the refrigerator according to the first embodiment.
Figure 3:
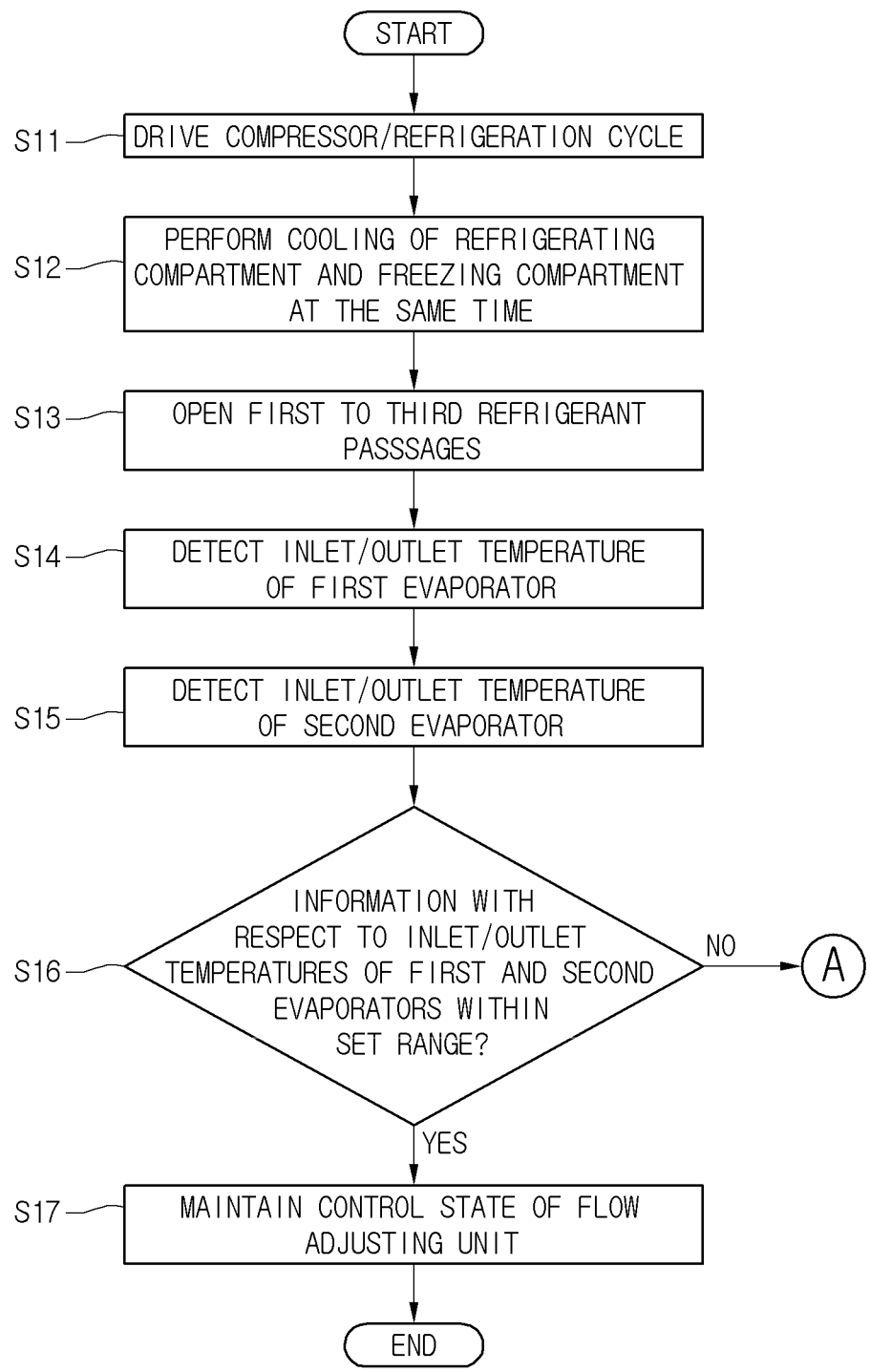
FIGS. 3 and 4 are flowcharts illustrating an example of a method for controlling the refrigerator according to the first embodiment.
Figure 4:
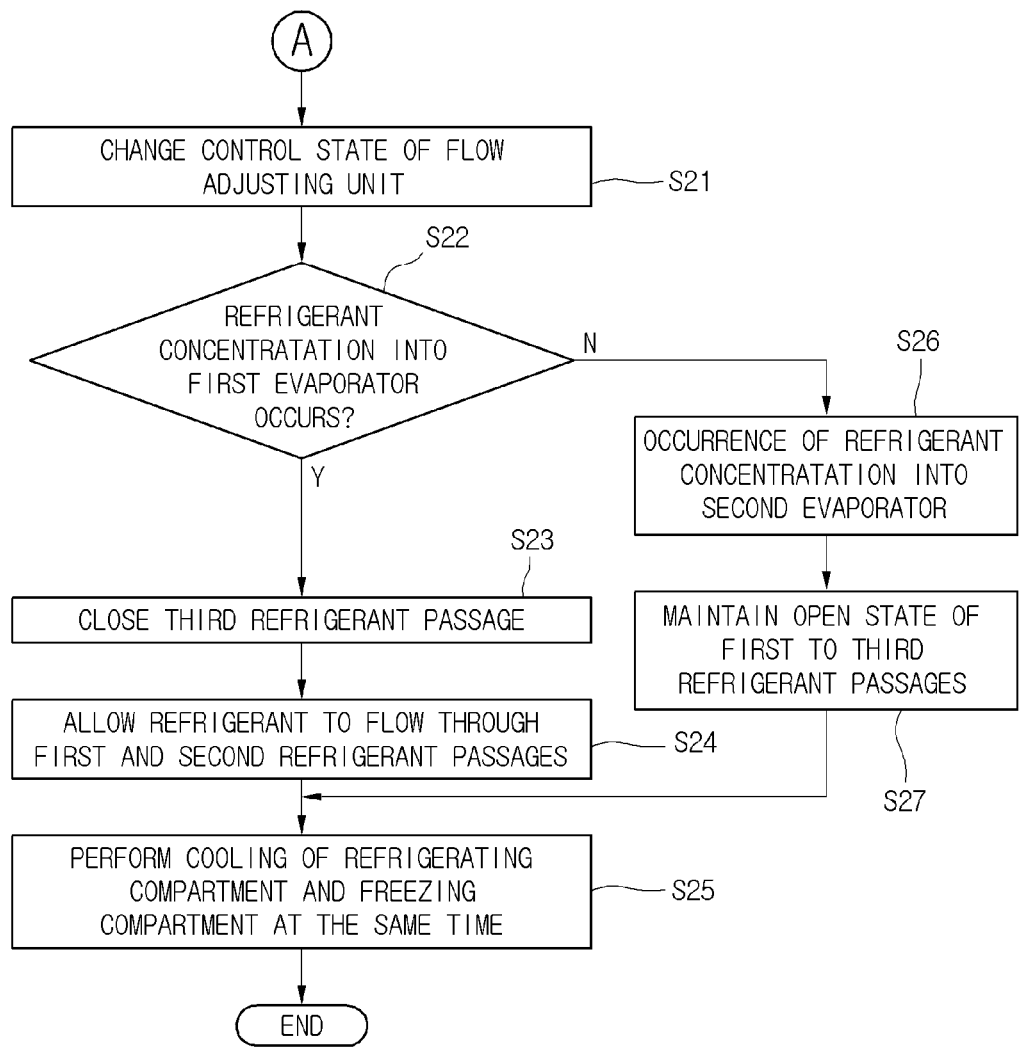

FIG. 2 is a block diagram of the refrigerator according to the first embodiment, and FIGS. 3 and 4 are flowcharts illustrating an example of a method for controlling the refrigerator according to the first embodiment.

Referring to FIG. 2, a refrigerator 10a according to the first embodiment may include a plurality of temperature sensors 210, 220, 230, and 240 for detecting inlet or outlet temperatures of each of the first and second evaporators 150 and 160. The plurality of temperature sensors 210, 220, 230, and 240 may include a first inlet temperature sensor 210 for detecting an inlet-side temperature of the first evaporator 150 and a first outlet temperature sensor 220 for detecting an outlet-side temperature of the first evaporator 150. Also, the plurality of temperature sensors 210, 220, 230, and 240 may include a second inlet temperature sensor 230 for detecting an inlet-side temperature of the second evaporator 160 and a second outlet temperature sensor 240 for detecting an outlet-side temperature of the second evaporator 160.

The refrigerator 10a may further include a control unit 200 (controller) for controlling an operation of the flow adjusting unit 130 on the basis of the temperatures detected by the plurality of temperature sensors 210, 220, 230, and 240. To perform cooling operations of the refrigerating and freezing compartments at the same time, the control unit 200 may control operations of the first and second compressors 111 and 115, the condensation fan 125, and the first and second evaporation fans 155 and 165.

A method for controlling the refrigerator according to the current embodiment will be described with reference to FIGS. 3 and 4. To operate the refrigerator, the first and second compressor 111 and 115 may be driven. A refrigeration cycle through the compression-condensation-expansion-evaporation of the refrigerant may operate according to the driving of the first and second compressors 111 and 115. The refrigerant evaporated in the second evaporator 160 may be compressed in the second compressor 115, and the compressed refrigerant may be mixed with the refrigerator evaporated in the first evaporator 150, and then, the mixture may be introduced into the first compressor 111 (S11).

The cooling operations of the refrigerating compartment and the freezing compartment may be performed at the same time according to the operation of the refrigeration cycle. To perform the cooling operations of the refrigerating compartment and the freezing compartment at the same time, the flow adjusting unit 130 may be controlled to open the first to third refrigerant passages 101, 103, and 105.

That is, when the first to third refrigerant passages 101, 103, and 105 are opened, the refrigerant may be introduced into the first and second evaporators 150 and 160. Then, the refrigerant may be heat-exchanged in the first and second evaporators 150 and 160 to supply cool air into the refrigerating compartment and the freezing compartment.

Also, a relatively large amount of refrigerant may be provided into the first evaporator 150, and an amount of refrigerant that is heat-exchanged in the first evaporator 150 may be greater than that of refrigerant that is heat-exchanged in the second evaporator 160. Thus, a cooling load of the refrigerant supplied into the storage compartment in which the first evaporator 150 is disposed, for example, the refrigerating compartment, may increase (S12, S13).

Inlet and outlet temperatures of the first evaporator 150 may be detected by the first inlet and outlet temperature sensors 210 and 220, respectively. Also, inlet and outlet temperatures of the second evaporator 160 may be detected by the second inlet and outlet temperature sensors 230 and 240, respectively (S14, S15).

The control unit 200 may determine an inlet/outlet temperature difference value of the first evaporator 150 and an inlet/outlet temperature difference value of the second evaporator 160. When an amount of refrigerant introduced into the first or second evaporator 150 or 160 is above an adequate amount, the inlet/outlet temperature difference of the first or second evaporator 150 or 160 may decrease. On the other hand, when an amount of refrigerant introduced into the first or second evaporator 150 or 160 is below the adequate amount, the inlet/outlet temperature difference of the first or second evaporator 150 or 160 may increase.

The control unit 200 may recognize whether information with respect to the inlet/outlet temperature differences of the first and second evaporators 150 and 160 is within a preset range. That is, the control unit 200 may recognize whether an amount of refrigerant flowing into the first or second evaporator 150 or 160 is greater or less than a prescribed amount, i.e., whether the refrigerant is concentrated into the first or second evaporator 150 or 160 on the basis of the inlet/outlet temperature difference of the first evaporator 150 and the inlet/outlet temperature difference of the second evaporator 160.

In detail, whether the amount of refrigerant flowing into the first or second evaporator 150 or 160 is greater or less than a prescribed amount may be determined on the basis of the inlet/outlet temperature difference of the first evaporator 150 and the inlet/outlet temperature difference of the second evaporator 160, or a ratio of the inlet/outlet temperature differences of the first and second evaporators 150 and 160 (S16).

Hereinafter, the detailed determination method will be described. As an example of the determination method, it may be determined whether the refrigerant is concentrated into one side according to whether the inlet/outlet temperature difference of the first evaporator 150 is equal to or is greater or less than a preset reference value.

The refrigerant circulated into the refrigeration cycle may be branched to flow into the first and second evaporators 150 and 160 through the flow adjusting unit 130. Thus, when the inlet/outlet temperature difference of the first evaporator 150 is detected, a ratio of the refrigerant passing through the first evaporator 150 may be determined. Here, a ratio of the refrigerant passing through the second evaporator 160 may be determined on the basis of the ratio of the refrigerant passing through the first evaporator 150.

For example, when the inlet/outlet temperature difference of the first evaporator 150 is greater than the reference value, it may be determined that an amount of refrigerant is less than a prescribed or desired amount. On the other hand, it may be determined that an amount of refrigerant flowing into the second evaporator 160 is relatively large.

In the current embodiment, a method for determining a refrigerant concentration phenomenon by using the inlet/outlet temperature difference of the first evaporator 150 will be described. Of course, the refrigerant concentration phenomenon may be determined by using the inlet/outlet temperature difference of the second evaporator 160.

If the inlet/outlet temperature difference of the first evaporator 150 is equal to the preset reference value, it may be determined that the refrigerant concentration phenomenon in the first or second evaporator 150 or 160 has not occurred. On the other hand, if the inlet/outlet temperature difference of the first evaporator 150 is not equal to the preset reference value and is greater or less than the reference value, it may be determined that the refrigerant concentration phenomenon in the first or second evaporator 150 or 160 has occurred.

In detail, if the inlet/outlet temperature difference of the first evaporator 150 is less than the preset reference value, it may be determined that a relatively large amount of refrigerant is passing through the first evaporator 150. That is, it may be determined that the refrigerant concentration phenomenon into the first evaporator 150 is occurring.

On the other hand, if the inlet/outlet temperature difference of the first evaporator 150 is greater than the preset reference value, it may be determined that a relatively small amount of refrigerant is passing through the first evaporator 150. That is, it may be determined that the refrigerant concentration phenomenon into the second evaporator 160 is occurring.

As another example of the determination method, it may be determined whether the refrigerant is concentrated into one side according to whether the inlet/outlet temperature difference of the first evaporator 150 is equal to or is greater or less than a first set value (or a prescribed ratio). For example, the first set value may be 1.

When a ratio of the inlet/outlet temperature difference of the first evaporator 150 to the inlet/outlet temperature difference of the second evaporator 160 is 1, i.e., the inlet/outlet temperature differences of the first and second evaporators 150 and 160 are the same, it may be determined that the refrigerant concentration phenomenon does not occur in the first or second evaporator 150 or 160.

On the other hand, when a ratio of the inlet/outlet temperature difference of the first evaporator 150 to the inlet/outlet temperature difference of the second evaporator 160 is greater than 1, i.e., the inlet/outlet temperature difference of the first evaporator 150 is greater than that of the second evaporator 160, it may be determined that the refrigerant concentration phenomenon does not occur in the second evaporator 160.

Also, when a ratio of the inlet/outlet temperature difference of the first evaporator 150 to the inlet/outlet temperature difference of the second evaporator 160 is less than 1, i.e., the inlet/outlet temperature difference of the first evaporator 150 is less than that of the second evaporator 160, it may be determined that the refrigerant concentration phenomenon does not occur in the first evaporator 150.

In another example of the determination method, it may be determined whether the refrigerant is concentrated into one side according to whether a difference value between the inlet/outlet temperature difference of the first evaporator 150 and the inlet/outlet temperature difference of the second evaporator 160 is equal to a second set value (or a prescribed difference), or is greater or less than the second set value. For example, the second set value may be 0.

When a value obtained by subtracting the inlet/outlet temperature difference of the second evaporator 160 from the inlet/outlet temperature difference of the first evaporator 150 is 0, i.e., the inlet/outlet temperature differences of the first and second evaporators 150 and 160 are the same, it may be determined that the refrigerant concentration phenomenon does not occur in the first or second evaporator 150 or 160.

On the other hand, when a difference of the inlet/outlet temperature difference of the first evaporator 150 to the inlet/outlet temperature difference of the second evaporator 160 is greater than 0, i.e., the inlet/outlet temperature difference of the first evaporator 150 is greater than that of the second evaporator 160, it may be determined that the refrigerant concentration phenomenon does not occur in the second evaporator 160.

Also, when a difference of the inlet/outlet temperature difference of the first evaporator 150 to the inlet/outlet temperature difference of the second evaporator 160 is less than 0, i.e., the inlet/outlet temperature difference of the first evaporator 150 is less than that of the second evaporator 160, it may be determined that the refrigerant concentration phenomenon does not occur in the first evaporator 150.

If it is determined that the refrigerant concentration phenomenon into the first or second evaporator 150 or 160 does not occur through one of the above-described three determination methods, the control state of the flow adjusting unit 130 may be maintained. That is, the flow adjusting unit 130 may be controlled to open all of the first to third refrigerant passages 101, 103, and 105 (S17). On the other hand, if it is determined that the refrigerant concentration phenomenon occurs in the first or second evaporator 150 or 160, the control state of the flow adjusting unit 130 may be changed (S21).

If the refrigerant concentration phenomenon occurs in the first evaporator 150, the third refrigerant passage 105 may be closed to control a flow of the refrigerant through only the first and second refrigerant passages 101 and 103. Of course, the first refrigerant passage 105 may be closed to control a flow of the refrigerant through the second and third refrigerant passages 103 and 105.

In this case, an amount of refrigerant introduced into the first evaporator 150 may decrease, and an amount of refrigerant introduced into the second evaporator 160 may increase to solve the refrigerant concentration phenomenon in the first evaporator 150 (S22, S23, S24).

If the refrigerant concentration phenomenon occurs in the second evaporator 160, the opened states of the first to third refrigerant passages 101, 103, and 105 may be maintained. Since a relatively large amount of refrigerant circulated into the refrigeration cycle is introduced into the first evaporator 150, the refrigerant concentration phenomenon in the second evaporator 160 may be solved (S26, S27).

As described above, when the refrigerant concentration phenomenon occurs in the first or second evaporator 150 or 160, the opening of the first to third refrigerant passages may be controlled to solve the refrigerant concentration phenomenon, and the refrigerating compartment and the freezing compartment may be cooled at the same time (S25).

Although not shown in FIG. 4, if the refrigerant concentration phenomenon occurs in the second evaporator 160 while the refrigerant flows through the first and second refrigerant passages 101 and 103 by the control in the operations S23 and S24, the third refrigerant passage 105 may be opened again to control a flow of the refrigerant through the first to third refrigerant passages 101, 103, and 105. Since the flow of the refrigerant into the first evaporator 150 relatively increases by the above-described control, the refrigerant concentration phenomenon into the second evaporator 160 may be solved.

As described above, since the plurality of refrigerant passages and expansion devices may be disposed at an inlet side of the first evaporator 150, and the flow of the refrigerant may be controlled according to the excess or leakage of the refrigerant introduced into the first and second evaporators 150 and 160, the refrigerant concentration phenomenon into one evaporator may be prevented while the plurality of evaporators operate at the same time.

Figure 5:
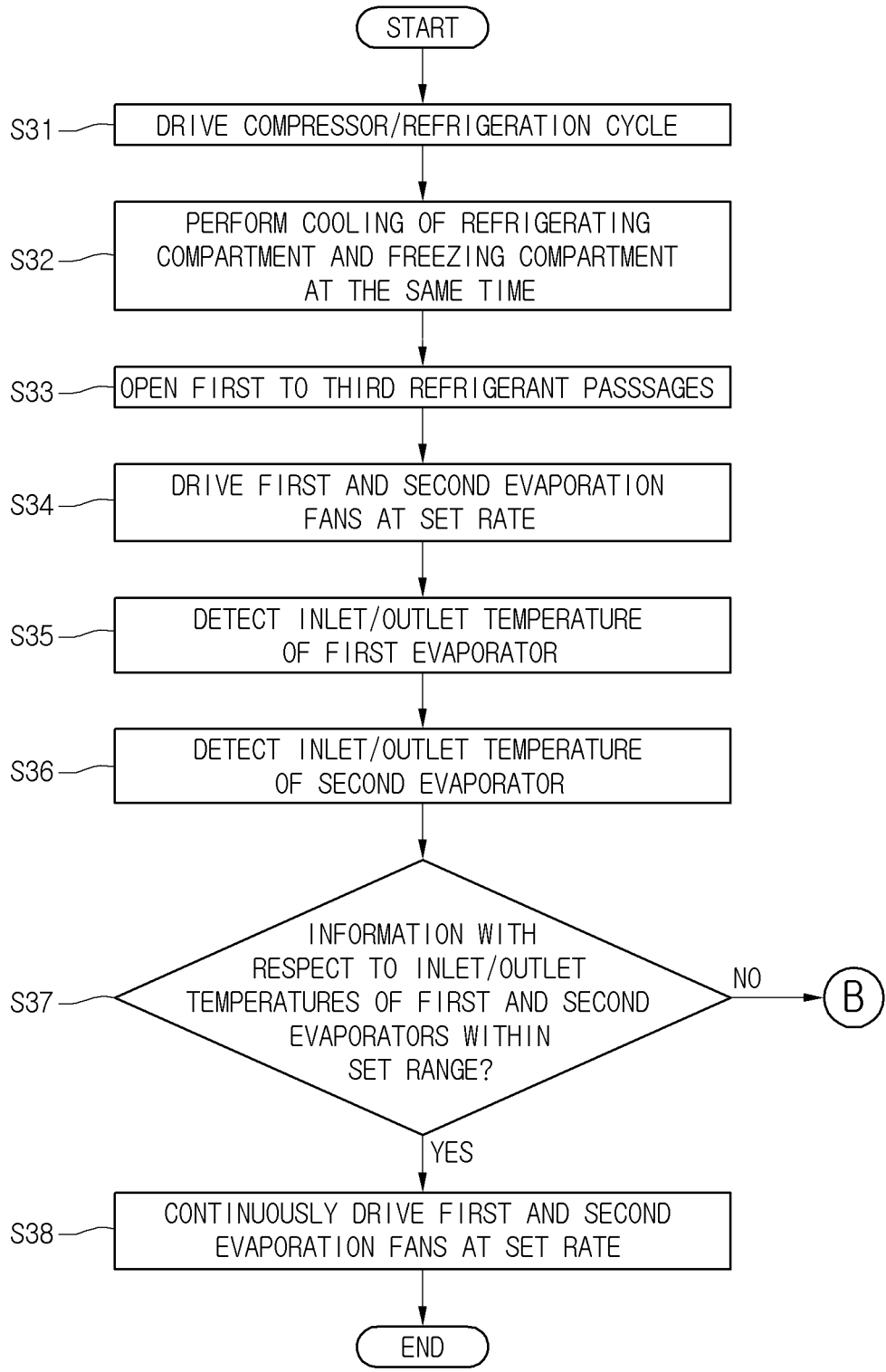
FIGS. 5 and 6 are flowcharts illustrating another example of the method for controlling the refrigerator according to the first embodiment.
Figure 6:
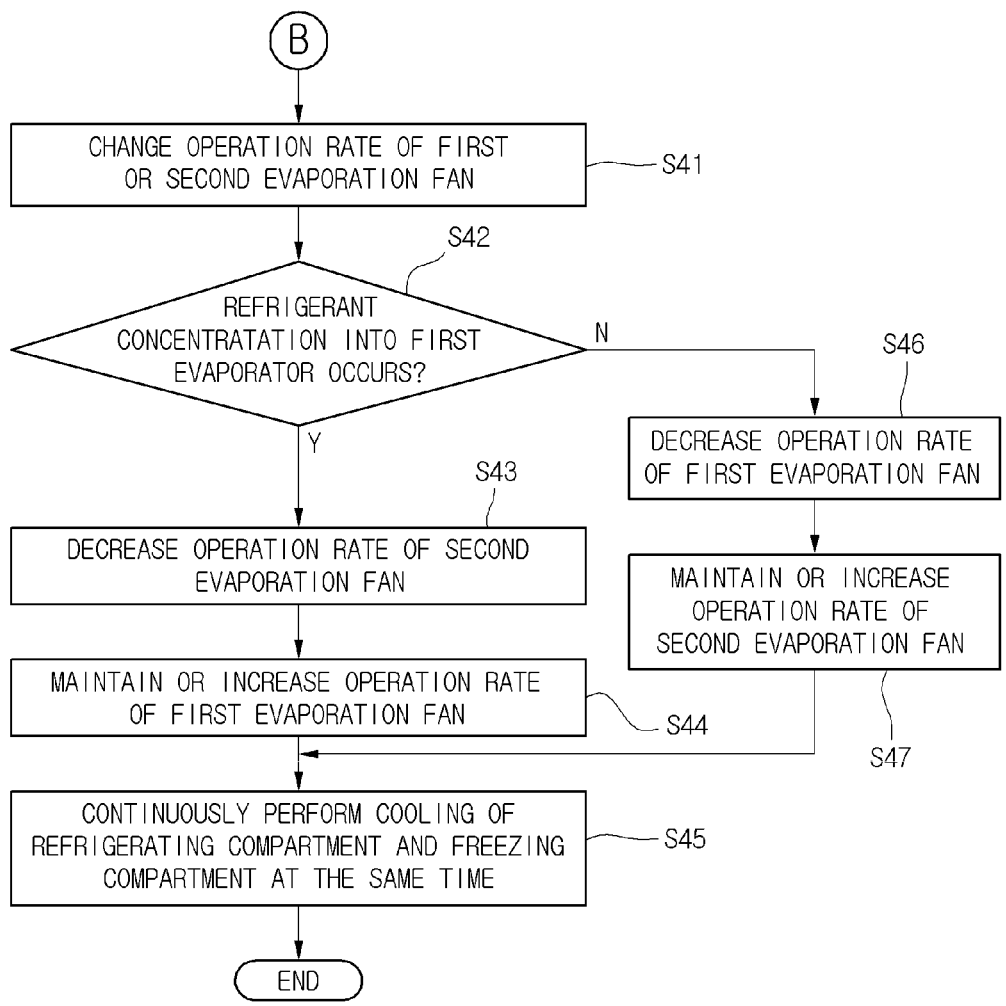

FIGS. 5 and 6 are flowcharts illustrating another example of the method for controlling the refrigerator according to the first embodiment. To operate the refrigerator, the first and second compressor 111 and 115 may be driven. A refrigeration cycle through the compression-condensation-expansion-evaporation of the refrigerant may operate according to the driving of the first and second compressors 111 and 115. The refrigerant evaporated in the second evaporator 160 may be compressed in the second compressor 115, and the compressed refrigerant may be mixed with the refrigerator evaporated in the first evaporator 150, and then, the mixture may be introduced into the first compressor 111 (S31).

The cooling operations of the refrigerating compartment and the freezing compartment may be performed at the same time according to the operation of the refrigeration cycle. To perform the cooling operations of the refrigerating compartment and the freezing compartment at the same time, the flow adjusting unit 130 may be controlled to open the first to third refrigerant passages 101, 103, and 105.

That is, when the first to third refrigerant passages 101, 103, and 105 are opened, the refrigerant may be introduced into the first and second evaporators 150 and 160. Then, the refrigerant may be heat-exchanged in the first and second evaporators 150 and 160 to supply cool air into the refrigerating compartment and the freezing compartment. Here, a relatively large amount of refrigerant is provided into the first evaporator 150, and an amount of refrigerant that is heat-exchanged in the first evaporator 150 may be greater than that of refrigerant that is heat-exchanged in the second evaporator 160.

In the current embodiment, when the operation of the refrigerator starts, the state of all of the first to third refrigerant passages 101, 103, and 105 may be initially opened as default. However, a default state may be set in a state in which the first and second refrigerant passages 101 and 103 are opened, and the third refrigerant passage 105 is closed (S32, S33).

The first and second evaporation fans 155 and 165 may operate at a set rate to perform the supply of the cool air into the refrigerating compartment and the freezing compartment. The set rate (hereinafter, referred to as a first set rate) of the first evaporation fan 155 may be an approximately middle rate or high rate, and the set rate (hereinafter, referred to a second set rate) of the second evaporation fan 165 may be a middle rate.

Here, as described in operation S33, when all of the first to third refrigerant passages 101, 103, and 105 are opened, a relatively greater amount of refrigerant may flow into the first evaporator 150. Thus, the first evaporation fan 155 may operate at a rate higher than that of the second evaporation fan 165.

For example, the high rate of the first or second evaporation fan 155 or 165 may correspond to an input voltage of about 13V and a wind amount of about 0.8 CMM. Also, the middle rate of the first or second evaporation fan 155 or 165 may correspond to an input voltage of about 10V and a wind amount of about 0.5 CMM. A low rate of the first or second evaporation fan 155 or 165 may correspond to an input voltage of about 9V and a wind amount of about 0.4 CMM (S34).

The inlet and outlet temperatures of the first evaporator 150 may be detected by the first inlet and outlet temperature sensors 210 and 220, respectively. Also, the inlet and outlet temperatures of the second evaporator 160 may be detected by the second inlet and outlet temperature sensors 230 and 240, respectively (S35, S36).

The control unit 200 may determine an inlet/outlet temperature difference valve of the first evaporator 150 and an inlet/outlet temperature difference valve of the second evaporator 160. Also, the control unit 200 may determine whether information with respect to the inlet/outlet temperature differences of the first and second evaporators 150 and 160 are within a preset range. The three determination methods will be derived from the description of FIG. 3.

If it is determined that the refrigerant concentration phenomenon into the first or second evaporator 150 or 160 does not occur through one of the above-described three determination methods, the first and second evaporation fans 155 and 165 may continuously operate at the first and second set rates (S37, S38). On the other hand, if it is determined that the refrigerant concentration phenomenon occurs in the first or second evaporator 150 or 160, the operation rate of the first or second evaporation fan 155 or 156 may be changed (S41).

If the refrigerant concentration phenomenon occurs in the first evaporator 150, the operation rate of the second evaporation fan 165 may be decreased. Thus, the second evaporation fan 165 may operate at a rate lower than the second set rate. For example, the second evaporation fan 165 may operate a low rate.

Also, since the operation rate of the first evaporation fan 155 is maintained or increased, the first evaporation fan 155 may be maintained at the first set rate or operated at a rate higher than the first set rate. For example, the first evaporation fan 155 may operate at the middle or high rate.

When the operation rate of the second evaporation fan 165 decreases, and the operation rate of the first evaporation fan 155 is maintained or increased, the refrigerant passing through the second evaporator 160 may decrease in evaporation pressure, and the refrigerant passing through the first evaporator 150 may be maintained or increased in evaporation pressure.

Due to the difference in pressure, the refrigerant passing through the flow adjusting unit 130 may flow more toward the second evaporator 160 than the first evaporator 150. Thus, the refrigerant concentration phenomenon into the first evaporator 150 may be reduced (S42, S43, S44). Also, in addition to the reduced refrigerant concentration phenomenon, the simultaneous cooling operation for the refrigerating compartment and the freezing compartment may be continuously performed (S45).

If the refrigerant concentration phenomenon occurs in the second evaporator 160, the operation rate of the first evaporation fan 155 may be decreased. Thus, the first evaporation fan 155 may operate at a rate lower than the first set rate. For example, the first evaporation fan 155 may operate a low rate.

Also, since the operation rate of the second evaporation fan 165 is maintained or increased, the second evaporation fan 165 may be maintained at the second set rate or operate at a rate higher than the second set rate. For example, the second evaporation fan 165 may operate at the middle or high rate.

When the operation rate of the first evaporation fan 155 decreases and the operation rate of the second evaporation fan 165 is maintained or increased, the refrigerant passing through the first evaporator 150 may decrease in evaporation pressure, and the refrigerant passing through the second evaporator 160 may be maintained or increased in evaporation pressure.

Due to the difference in pressure, the refrigerant passing through the flow adjusting unit 130 may flow more toward the first evaporator 150 than the second evaporator 160. Thus, the refrigerant concentration phenomenon into the second evaporator 160 may be reduced (S46, S47).

Figure 7:
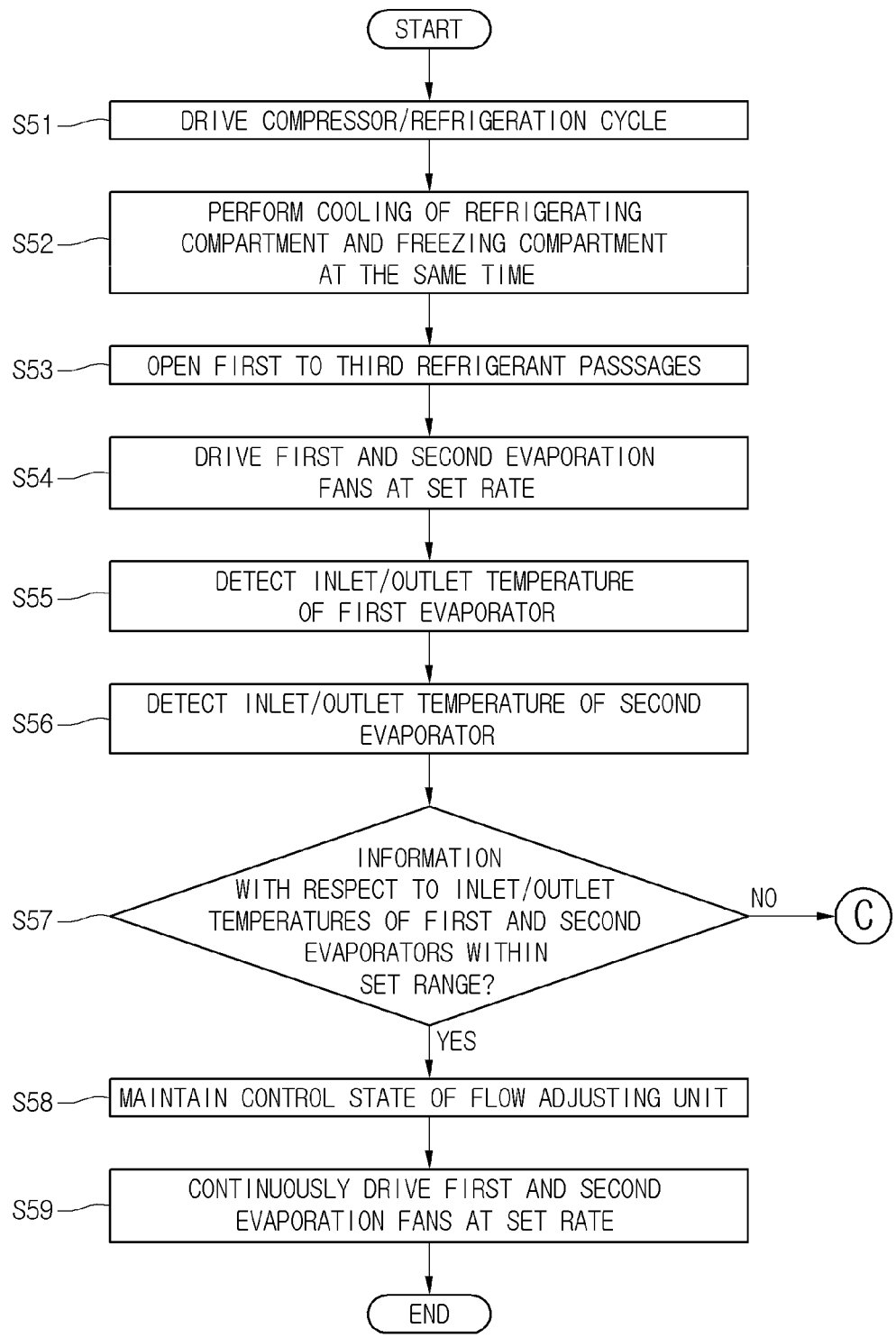
FIGS. 7 and 8 are flowchart illustrating further another example of the method for controlling the refrigerator according to the first embodiment.
Figure 8:
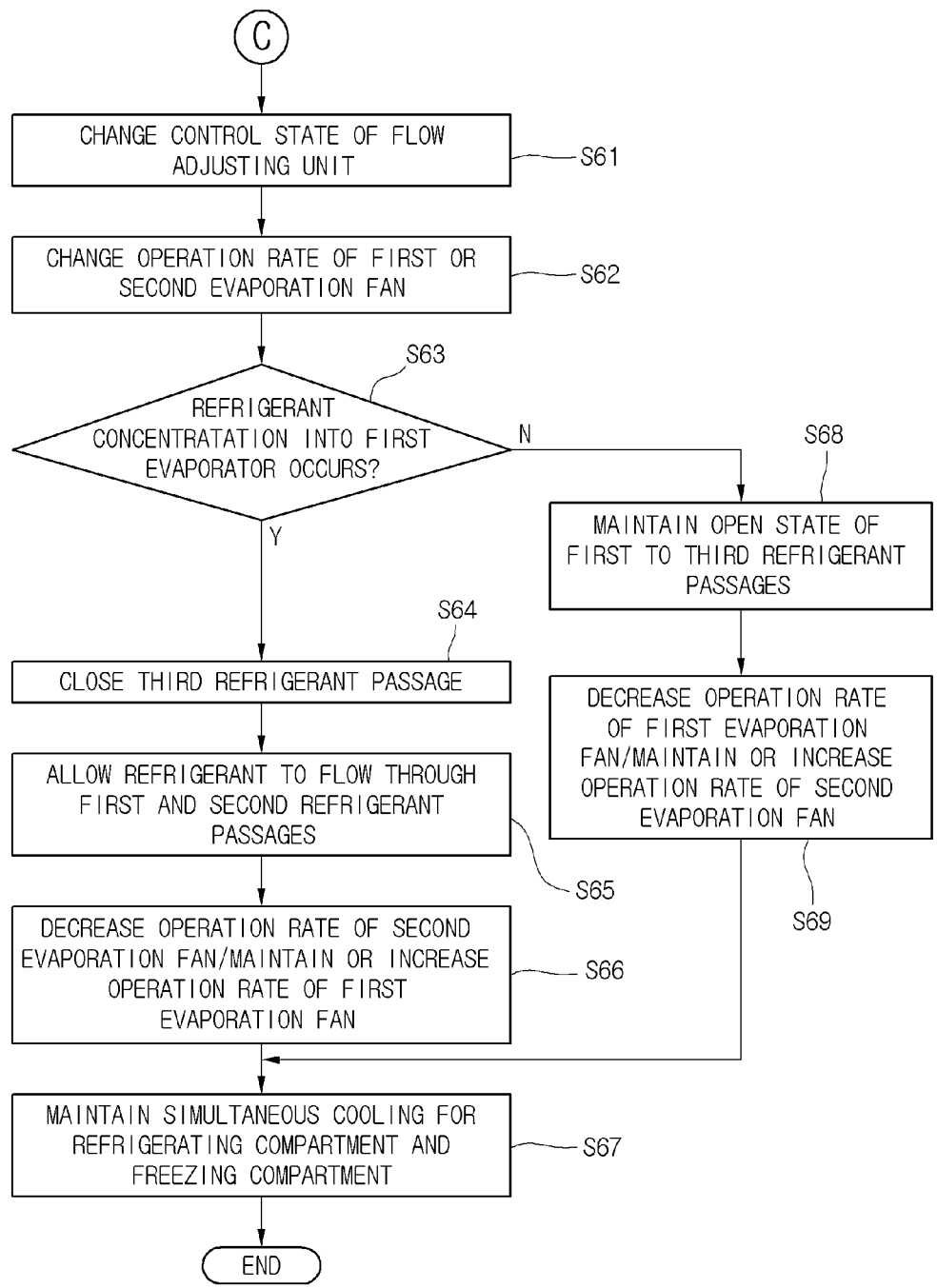

FIGS. 7 and 8 are flowcharts illustrating another example of the method for controlling the refrigerator according to the first embodiment. To operate the refrigerator, the first and second compressors 111 and 115 operate to drive the refrigeration cycle, thereby performing the simultaneous cooling operation for the refrigerating compartment and the freezing compartment. To perform the simultaneous cooling operation of the refrigerating compartment and the freezing compartment, the flow adjusting unit 130 may be controlled to open the first to third refrigerant passages 101, 103, and 105 (S51, S52, S53).

While performing the simultaneous cooling operation, the first and second evaporation fans 155 and 165 may operate at the first and second set rates, respectively. Here, the second set rate of the second evaporation fan 165 may be an approximately middle rate, and the first set rate of the first evaporation fan 155 may be an approximately middle rate or a high rate (S54).

Inlet and outlet temperatures of the first evaporator 150 and inlet and outlet temperatures of the second evaporator 160 may be detected (S55, S56). The control unit 200 may determine an inlet/outlet temperature difference valve of the first evaporator 150 and an inlet/outlet temperature difference valve of the second evaporator 160 to determine whether information with respect to the inlet/outlet temperature differences of the first and second evaporators 150 and 160 is within a preset range.

Also, the control unit 200 may recognize whether an amount of refrigerant flowing into the first or second evaporator 150 or 160 is high or low, i.e., whether the refrigerant is concentrated into the first or second evaporator 150 or 160 according to whether the information with respect to the inlet/outlet temperature differences of the first and second evaporators 150 and 160 is within the preset range.

If the information with respect to the inlet/outlet temperature differences of the first and second evaporators 150 and 160 are within the preset range, it may be determined that the refrigerant concentration phenomenon into the first or second evaporator 150 or 160 may not occur.

In this case, the control state of the flow adjusting unit 130 may be maintained. That is, the flow adjusting unit 130 may be controlled to open all of the first to third refrigerant passages 101, 103, and 105 (S58). Also, the first and second evaporation fans 155 and 165 may continuously operate at the first and second set rates, respectively (S59).

On the other hand, if it is determined that the refrigerant concentration phenomenon occurs in the first or second evaporator 150 or 160, the control state of the flow adjusting unit 130 may be changed. Also, the first or second evaporation fan 155 or 165 may be changed in operation rate (S61, S62).

If the refrigerant concentration phenomenon occurs in the first evaporator 150, the third refrigerant passage 105 may be closed to control a flow of the refrigerant through the first and second refrigerant passages 101 and 103. Of course, the first refrigerant passage 105 may be closed to control a flow of the refrigerant through the second and third refrigerant passages 103 and 105. In this case, an amount of refrigerant introduced into the first evaporator 150 may decrease, and an amount of refrigerant introduced into the second evaporator 160 may increase to solve the refrigerant concentration phenomenon in the first evaporator 150 (S63, S63, S64).

Since the operation rate of the second evaporation fan 165 is decreased, the second evaporation fan 165 may operate at a rate lower than the second set rate, for example, the low rate. Also, since the operation rate of the first evaporation fan 155 is maintained or increased, the first evaporation fan 155 may be maintained at the first set rate or operate at a rate higher than the first set rate. For example, the first evaporation fan 155 may operate at the middle or high rate.

When the operation rate of the second evaporation fan 165 is decreased, and the operation rate of the first evaporation fan 155 is maintained or increased, the refrigerant may flow more toward the second evaporator 160 than the first evaporator 150 due to the evaporation pressure difference between the first and second evaporations 150 and 160. Thus, the refrigerant concentration phenomenon into the first evaporator 150 may be reduced (S66). Also, in addition to the reduced refrigerant concentration phenomenon, the simultaneous cooling operation for the refrigerating compartment and the freezing compartment may be continuously performed (S67).

If the refrigerant concentration phenomenon occurs in the second evaporator 160, the opened states of the first to third refrigerant passages 101, 103, and 105 may be maintained (S68). Also, since the operation rate of the first evaporation fan 165 is decreased, the first evaporation fan 155 may operate at a rate lower than the first set rate. For example, the first evaporation fan 155 may operate at the low rate.

Also, since the operation rate of the second evaporation fan 165 is maintained or increased, the second evaporation fan 165 may be maintained at the second set rate or operate at a rate higher than the second set rate. For example, the second evaporation fan 165 may operate at the middle or high rate.

When the operation rate of the first evaporation fan 155 is decreased, and the operation rate of the second evaporation fan 165 is maintained or increased, the refrigerant passing through the flow adjusting unit 130 may flow more toward the first evaporator 150 than the second evaporator 160 due to the evaporation pressure difference between the first and second evaporations 150 and 160. Thus, the refrigerant concentration phenomenon into the second evaporator 160 may be reduced (S69).

Hereinafter, the second and third embodiments will be described. Since the embodiments are the same as the first embodiment except for only portions of the constitutions, different points therebetween will be described principally, and descriptions of the same parts will be denoted by the same reference numerals and descriptions of the first embodiment.

Figure 9:
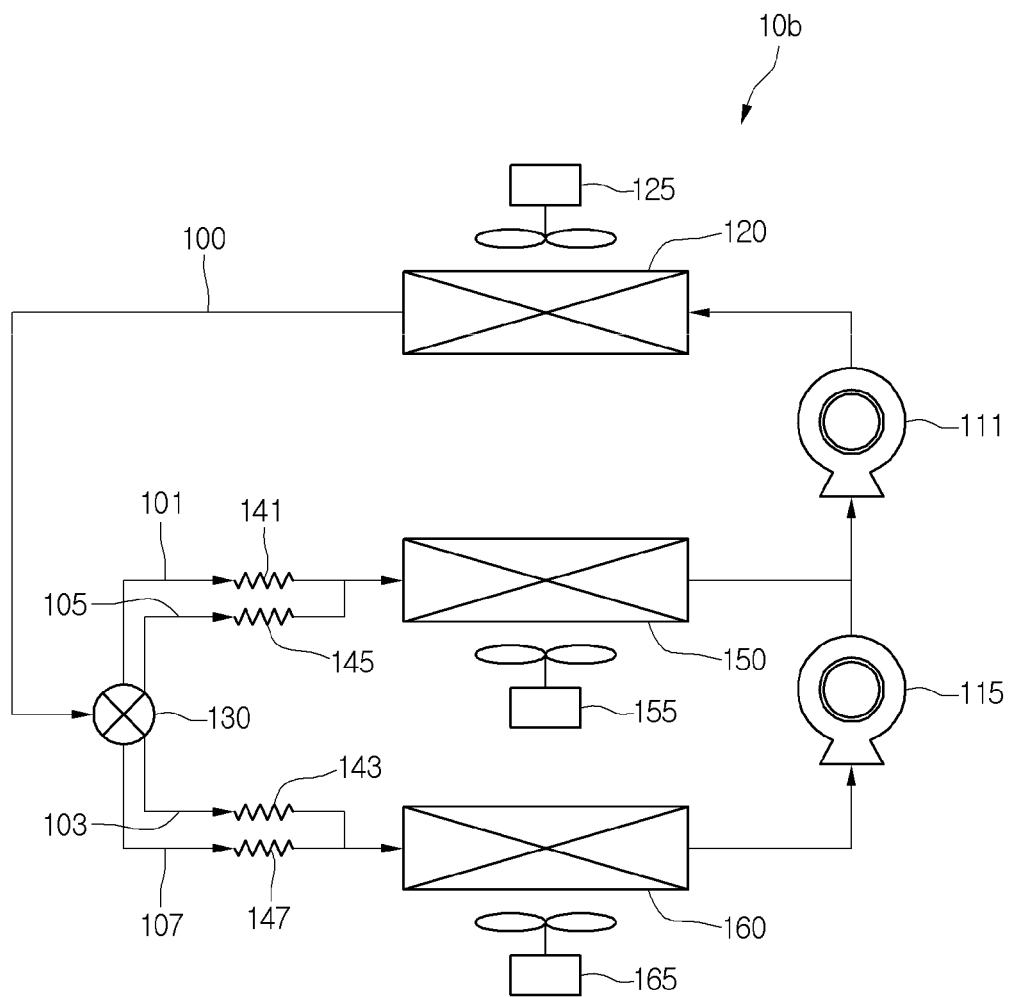
FIG. 9 is a view illustrating a system having a refrigeration cycle in a refrigerator according to a second embodiment.
Figure 10:
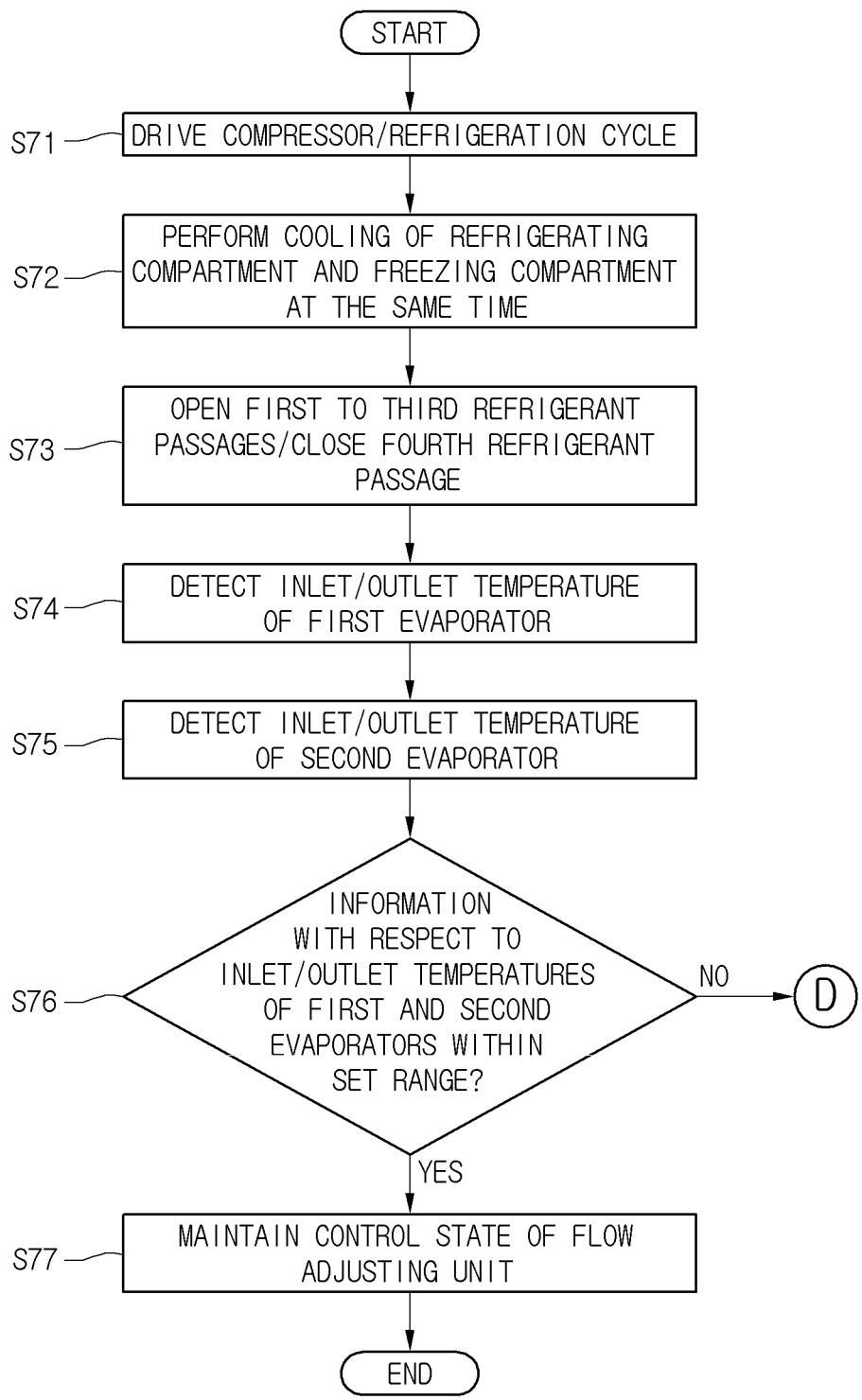
FIGS. 10 and 11 are flowcharts illustrating a method for controlling the refrigerator according to the second embodiment.
Figure 11:
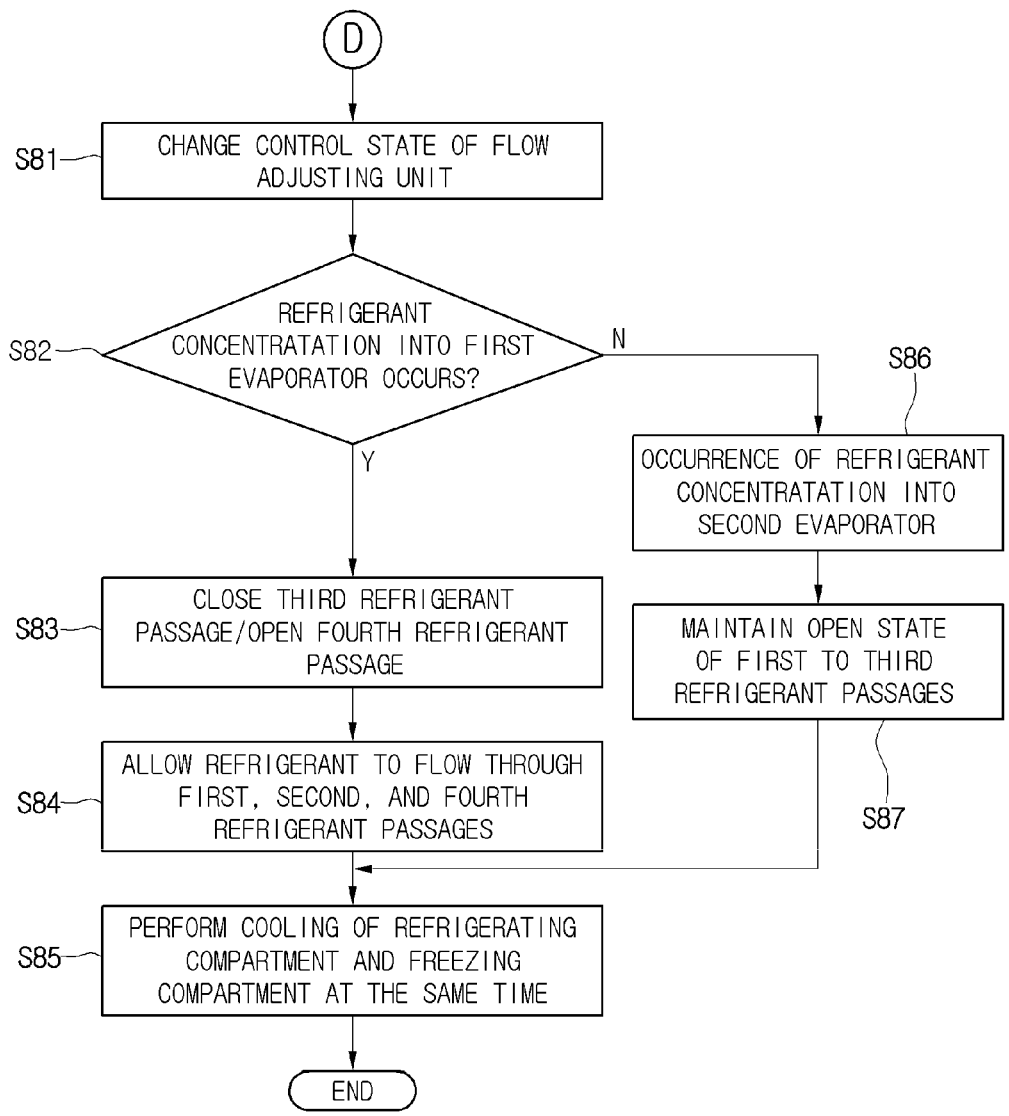

FIG. 9 is a view illustrating a system having a refrigeration cycle in a refrigerator according to a second embodiment, and FIGS. 10 and 11 are flowcharts illustrating a method for controlling the refrigerator according to the second embodiment.

Referring to FIG. 9, a refrigerator 10b according to a second embodiment includes a refrigerant tube 100 for guiding a flow of a refrigerant condensed in a condenser 120, a flow adjusting unit 130 disposed in the refrigerant tube 100 to branch the refrigerant into first and second evaporators 150 and 160, and a plurality of refrigerant passages 101, 103, 105, and 107 extending from an outlet side of the flow adjusting unit 130 to the first and second evaporators 150 and 160.

The plurality of refrigerant passages 101, 103, 105, and 107 may be understood as "branch passages" that are branched from the refrigerant tube 100. The plurality of refrigerant passages 101, 103, 105, and 107 may include first and third refrigerant passages 101 and 103 connected to the first evaporator 150 and second and fourth refrigerant passages 103 and 107 connected to the second evaporator 160.

The first and third refrigerant passages 101 and 105 may be called a "first evaporation passage" in that the first and third refrigerant passages 101 and 105 guide the introduction of the refrigerant into the first evaporator 150. Also, the second and fourth refrigerant passages 103 and 107 may be called a "second evaporation passage" in that the second and fourth refrigerant passages 103 and 107 guide the introduction of the refrigerant into the second evaporator 160.

The refrigerant flowing into the first and third refrigerant passages 101 and 105 may be mixed with each other and then introduced into the first evaporator 150. Also, the refrigerant flowing into the second and fourth refrigerant passages 103 and 107 may be mixed with each other and then be introduced into the second evaporator 160.

Also, as described in the first embodiment, the refrigerant discharged from the second evaporator 160 may be suctioned into the second compressor 115, and the refrigerant compressed in the second compressor 115 may be mixed with the refrigerant discharged from the first evaporator 150 and then be suctioned into the first compressor 111.

A plurality of expansion devices 141, 143, 145, and 147 may be disposed in the plurality of refrigerant passages 101, 103, 105, and 107, respectively. Each of the plurality of expansion devices 141, 143, 145, and 147 may include a capillary tube. In detail, the plurality of expansion devices 141, 143, 145, and 147 may include a first expansion device 141 disposed in the first refrigerant passage 101, a second expansion device 143 disposed in the second refrigerant passage 103, a third expansion device 145 disposed in the third refrigerant passage 105, and a fourth expansion device 147 disposed in the fourth refrigerant passage 107.

The flow adjusting unit 130 may include a five-way valve having one inflow hole through which the refrigerant is introduced and four discharge holes through which the refrigerant is discharged. The four discharge holes may be connected to the first to fourth refrigerant passages 101, 103, 105, and 107.

At least one of the first and third refrigerant passages 101 and 105 and at least one of the second and fourth refrigerant passages 103 and 104 may be opened according to the control of the flow adjusting unit 130. For example, when the first to third refrigerant passages 101, 103, and 105 are opened and the fourth refrigerant passage 107 is closed, an amount of refrigerant introduced into the first evaporator 150 may be greater than that of refrigerant introduced into the second evaporator 160. On the other hand, when the first, second, and fourth refrigerant passages 101, 103, and 107 are opened, and the third refrigerant passage 105 is closed, an amount of refrigerant introduced into the second evaporator 160 may be greater than that of refrigerant introduced into the first evaporator 150.

As described above, since the plurality of refrigerant passages and expansion devices are disposed on inlet sides of the first and second evaporators 150 and 160, and at least one refrigerant passage of the plurality of refrigerant passages may be opened or closed to control an amount of refrigerant that flows through either the first or second evaporators 150, 160, a refrigerant concentration phenomenon into one evaporator may be prevented while the plurality of evaporators operate at the same time.

Hereinafter, a method for controlling a refrigerator according to the current embodiment will be described with reference to the flowchart. Referring to FIGS. 10 and 11, to operate the refrigerator, the first and second compressor 111 and 115 are driven. A refrigeration cycle through the compression-condensation-expansion-evaporation of the refrigerant may operate according to the driving of the first and second compressors 111 and 115 (S71).

Also, the cooling operations of the refrigerating compartment and the freezing compartment may be performed at the same time according to the operation of the refrigeration cycle. To perform the cooling operations of the refrigerating compartment and the freezing compartment at the same time, the flow adjusting unit 130 may be controlled to open the first to third refrigerant passages 101, 103, and 105 and close the fourth refrigerant passage 107.

When the refrigerant passages are opened or closed as described above, since a relatively greater amount of refrigerant is provided into the first evaporator 150, an amount of refrigerant that is heat-exchanged in the first evaporator 150 may be greater than that of refrigerant that is heat-exchanged in the second evaporator 160. Thus, a cooling load of the refrigerant supplied into the storage compartment in which the first evaporator 150 is disposed, for example, the refrigerating compartment, may increase (S72, S73).

Inlet and outlet temperatures of the first evaporator 150 may be detected by first inlet and outlet temperature sensors 210 and 220, respectively. Also, inlet and outlet temperatures of the second evaporator 160 may be detected by second inlet and outlet temperature sensors 230 and 240, respectively (S74, S75).

The control unit 200 may determine an inlet/outlet temperature difference valve of the first evaporator 150 and an inlet/outlet temperature difference valve of the second evaporator 160. Also, the control unit 200 may recognize whether information with respect to the inlet/outlet temperature differences of the first and second evaporators 150 and 160 are within a preset range. The three determination methods will be derived from the descriptions according to the first embodiment.

If it is determined that the refrigerant concentration phenomenon into the first or second evaporator 150 or 160 does not occur through the above-described determination methods, the control state of the flow adjusting unit 130 may be maintained. That is, the flow adjusting unit 130 may be controlled to open the first to third refrigerant passages 101, 103, and 105 and close the fourth refrigerant passage 107 (S76, S77).

On the other hand, if it is determined that the refrigerant concentration phenomenon occurs in the first or second evaporator 150 or 160, the control state of the flow adjusting unit 130 may be changed (S81). If the refrigerant concentration phenomenon occurs in the first evaporator 150, the third refrigerant passage 105 may be closed, and the fourth refrigerant passage 107 may be opened to control a flow of the refrigerant through the first, second, and fourth refrigerant passages 101, 103, and 107. Here, the first refrigerant passage 101 may be closed instead of the third refrigerant passage 105.

In this case, an amount of refrigerant introduced into the first evaporator 150 may decrease, and an amount of refrigerant introduced into the second evaporator 160 may increase to solve the refrigerant concentration phenomenon in the first evaporator 150 (S82, S83, S84).

If the refrigerant concentration phenomenon occurs in the second evaporator 160, the opened states of the first to third refrigerant passages 101, 103, and 105 may be maintained. Since a relatively large amount of refrigerant circulated into the refrigeration cycle is introduced into the first evaporator 150, the refrigerant concentration phenomenon into the second evaporator 160 may be solved (S86, S87).

As described above, when the refrigerant concentration phenomenon occurs in the first or second evaporator 150 or 160, the opening of the first to fourth refrigerant passages may be controlled to solve the refrigerant concentration phenomenon, and the refrigerating compartment and the freezing compartment may be cooled at the same time (S85).

Although not shown in FIG. 11, if the refrigerant concentration phenomenon occurs in the second evaporator 160 while the refrigerant flows through the first, second, and fourth refrigerant passages 101, 103, and 107 by the control in the operations S83 and S84, the third refrigerant passage 105 may be opened again, and the fourth refrigerant passage 107 may be closed to control a flow of the refrigerant through the first to third refrigerant passages 101, 103, and 105. Since the flow of the refrigerant into the first evaporator 150 relatively increases by the above-described control, the refrigerant concentration phenomenon into the second evaporator 160 may be solved.

As described above, since the plurality of refrigerant passages and expansion devices are disposed at inlet sides of the first and second evaporators 150 and 160, and the flow of the refrigerant is controlled according to the amount of the refrigerant introduced into the first and second evaporators 150 and 160, the refrigerant concentration phenomenon into one evaporator may be prevented while the plurality of evaporators operate at the same time.

Figure 12:
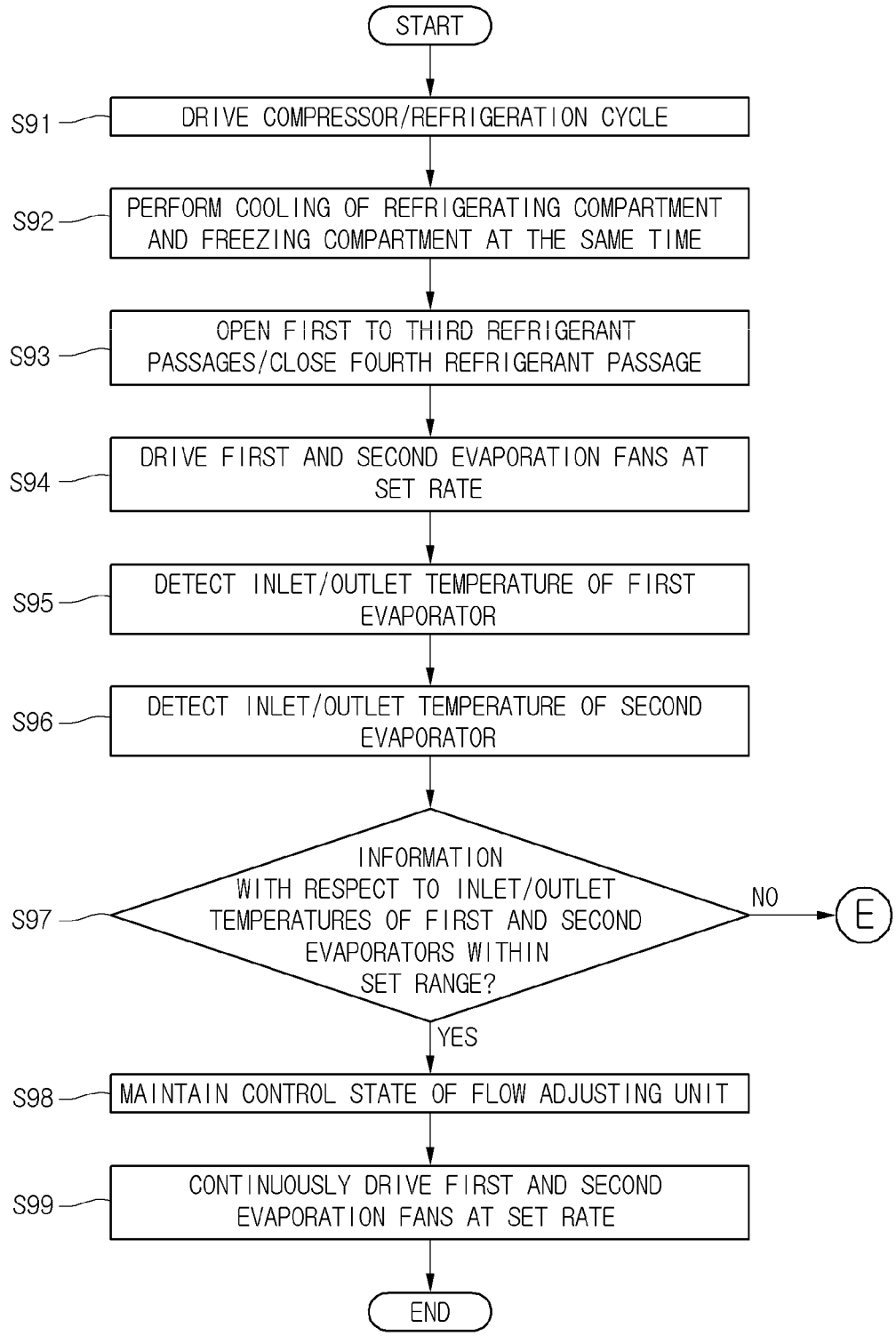
FIGS. 12 and 13 are flowcharts illustrating another example of the method for controlling the refrigerator according to the second embodiment.
Figure 13:
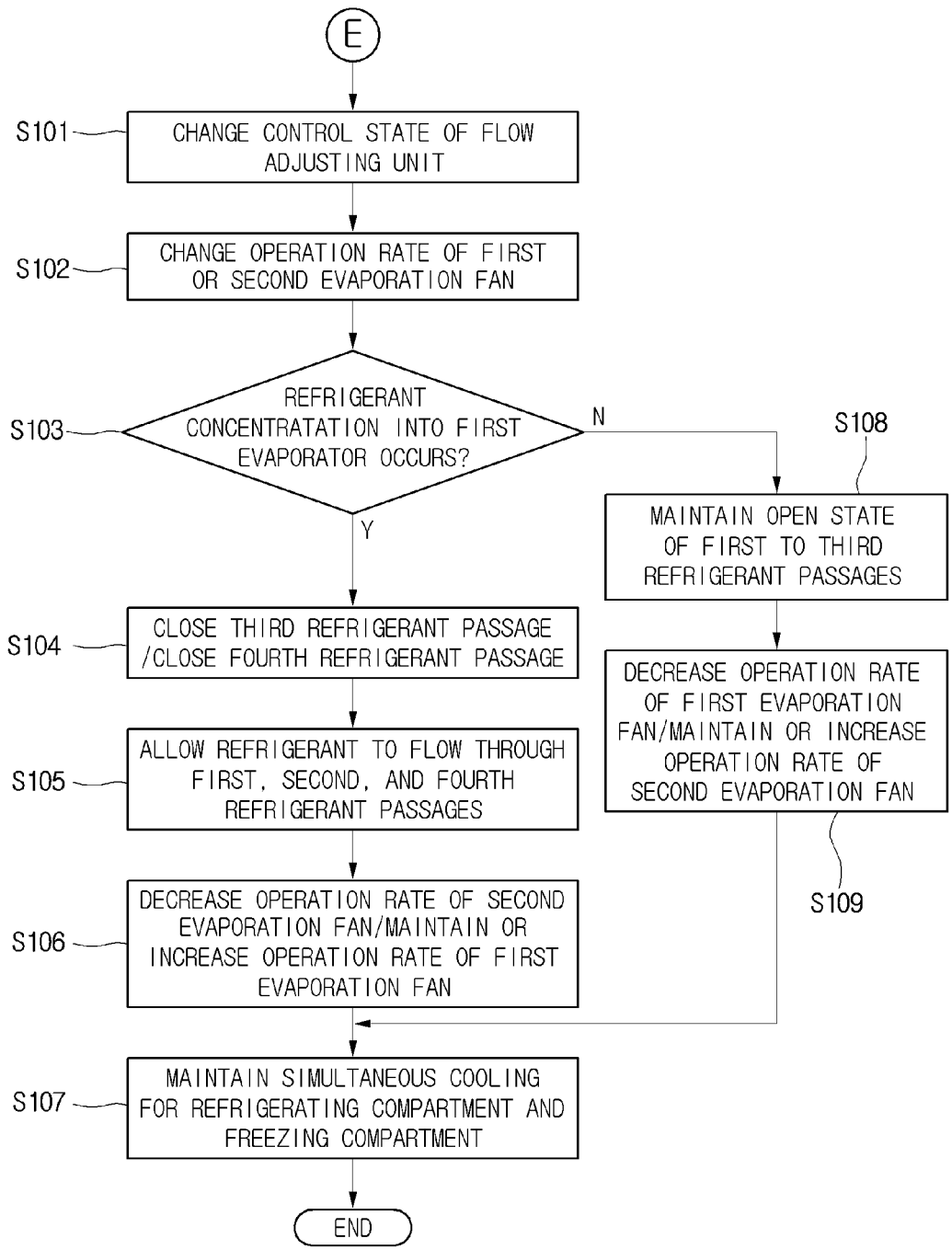

FIGS. 12 and 13 are flowcharts illustrating another example of the method for controlling the refrigerator according to the second embodiment. When the first and second compressor 111 and 115 operate, a refrigeration cycle through compression-condensation-expansion-evaporation of the refrigerant may operate (S91).

The cooling operations of the refrigerating compartment and the freezing compartment may be performed at the same time according to the operation of the refrigeration cycle. To perform the cooling operations of the refrigerating compartment and the freezing compartment at the same time, the flow adjusting unit 130 may be controlled to open the first to third refrigerant passages 101, 103, and 105 and close the fourth refrigerant passage 107.

In the current embodiment, when the operation of the refrigerator starts, the state in which the first to third refrigerant passages 101, 103, and 105 are opened, and the fourth refrigerant passage 107 is closed is described as an initial default. However, the initial default state may be a state in which all of the first to fourth refrigerant passages 101, 103, 015, and 107 are opened (S92, S93).

While performing the simultaneous cooling operation, the first and second evaporation fans 155 and 165 may operate at the first and second set rates, respectively. Here, the second set rate of the second evaporation fan 165 may be an approximately middle rate, and the first set rate of the first evaporation fan 155 may be an approximately middle rate or a high rate (S94).

Inlet and outlet temperatures of the first evaporator 150 and inlet and outlet temperatures of the second evaporator 160 may be detected (S95, S96). The control unit 200 may recognize whether the refrigerant concentration phenomenon into the first or second evaporator 150 or 160 occurs according to whether information with respect to the inlet/outlet temperature differences of the first and second evaporators 150 and 160 are within a preset range.

If it is determined that the refrigerant concentration phenomenon into the first or second evaporator 150 or 160 does not occur, the control state of the flow adjusting unit 130 may be maintained. That is, the flow adjusting unit 130 may be controlled to open the first to third refrigerant passages 101, 103, and 105 and close the fourth refrigerant passage 107 (S96, S97). Also, the first and second evaporation fans 155 and 165 may continuously operate at the first and second set rates, respectively (S99).

On the other hand, if it is determined that the refrigerant concentration phenomenon occurs in the first or second evaporator 150 or 160, the control state of the flow adjusting unit 130 may be changed. Also, the first or second evaporation fan 155 or 165 may be changed in operation rate (S101, S102).

If the refrigerant concentration phenomenon occurs in the first evaporator 150, the third refrigerant passage 105 may be closed, and the fourth refrigerant passage 107 may be opened to control a flow of the refrigerant through the first, second, and fourth refrigerant passages 101, 103, and 107. Here, the first refrigerant passage 101 may be closed instead of the third refrigerant passage 105. In this case, an amount of refrigerant introduced into the first evaporator 150 may decrease, and an amount of refrigerant introduced into the second evaporator 160 may be increased to solve the refrigerant concentration phenomenon in the first evaporator 150 (S102, S103, S104).

Also, since the operation rate of the second evaporation fan 165 decreases, the second evaporation fan 165 may operate at a rate lower than the second set rate, for example, the low rate. Also, since the operation rate of the first evaporation fan 155 is maintained or increased, the first evaporation fan 155 may be maintained at the first set rate or operate at a rate higher than the first set rate. For example, the first evaporation fan 155 may operate at the middle or high rate.

When the operation rate of the second evaporation fan 165 decreases and the operation rate of the first evaporation fan 155 is maintained or increased, the refrigerant may flow more toward the second evaporator 160 than the first evaporator 150 due to the evaporation pressure difference between the first and second evaporations 150 and 160. Thus, the refrigerant concentration phenomenon into the first evaporator 150 may be reduced (S106). Also, in addition to the reduced refrigerant concentration phenomenon, the simultaneous cooling operation for the refrigerating compartment and the freezing compartment may be continuously performed (S107).

If the refrigerant concentration phenomenon occurs in the second evaporator 160, the opened states of the first to third refrigerant passages 101, 103, and 105 may be maintained (S108). Also, since the operation rate of the first evaporation fan 165 decreases, the first evaporation fan 155 may operate at a rate lower than the first set rate. For example, the first evaporation fan 155 may operate at the low rate.

Also, since the operation rate of the second evaporation fan 165 is maintained or increased, the second evaporation fan 165 may be maintained at the second set rate or operate at a rate higher than the second set rate. For example, the second evaporation fan 165 may operate at the middle or high rate.

When the operation rate of the first evaporation fan 155 decreases and the operation rate of the second evaporation fan 165 is maintained or increases, the refrigerant passing through the flow adjusting unit 130 may flow more toward the first evaporator 150 than the second evaporator 160 due to the evaporation pressure difference between the first and second evaporations 150 and 160. Thus, the refrigerant concentration phenomenon into the second evaporator 160 may be reduced (S109).

Figure 14:
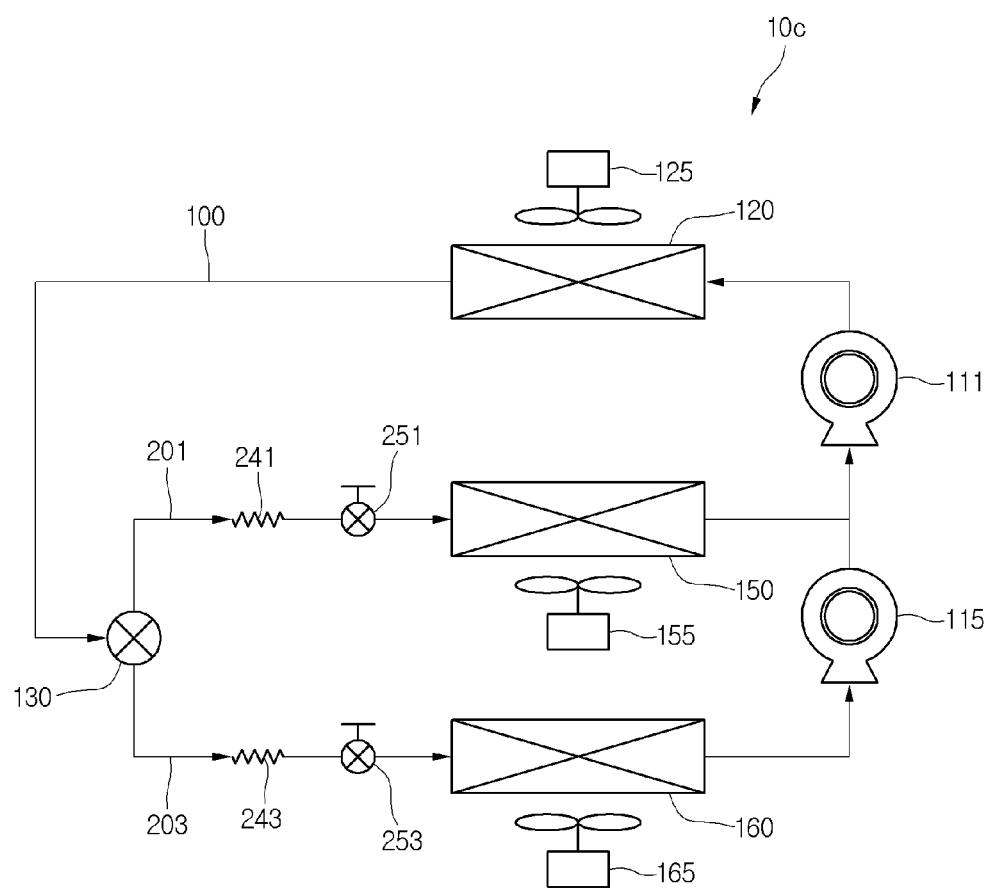
FIG. 14 is a view illustrating a system having a refrigeration cycle in a refrigerator according to a third embodiment.
Figure 15:
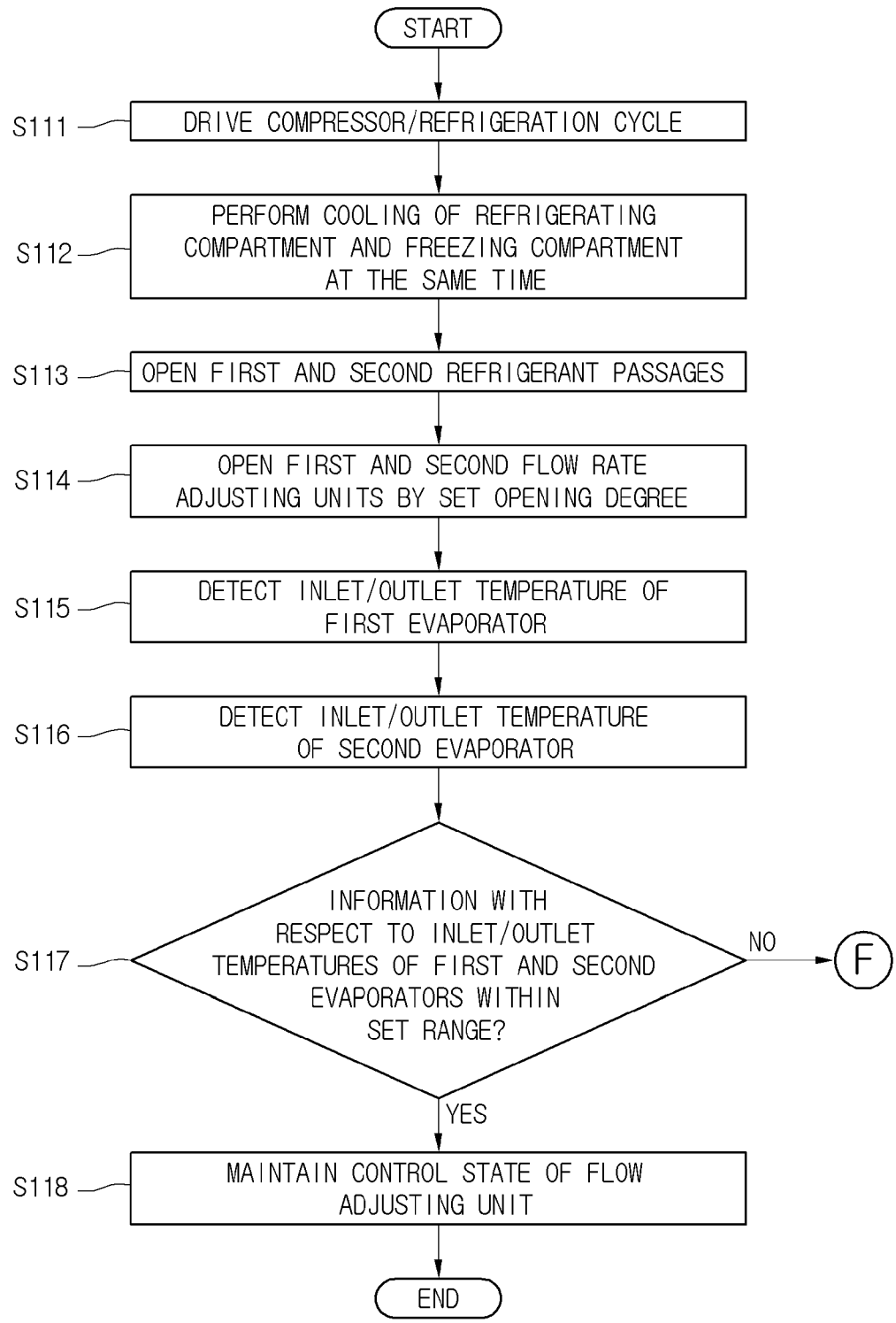
FIGS. 15 and 16 are flowcharts illustrating a method for controlling the refrigerator according to the third embodiment.
Figure 16:
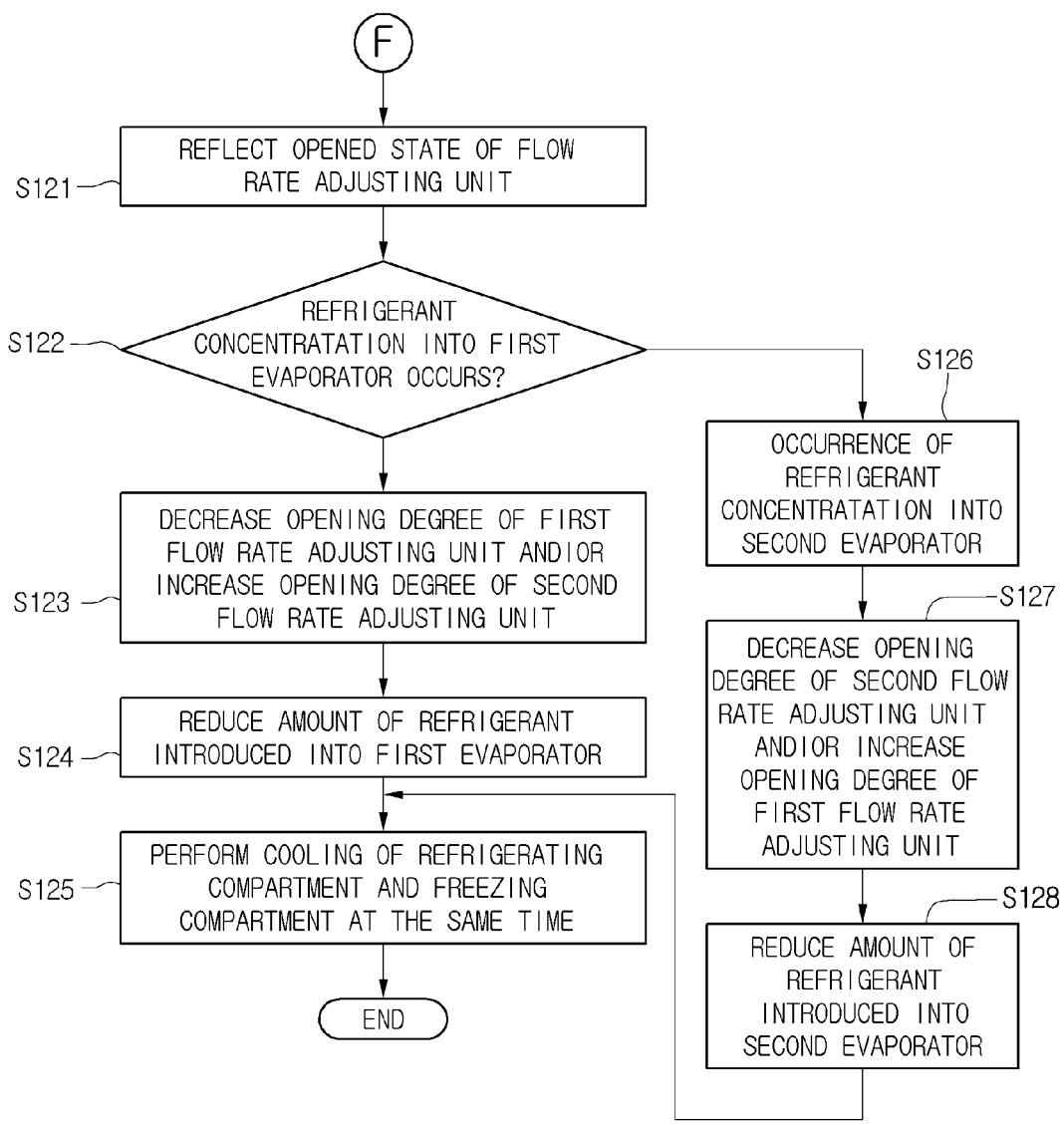

FIG. 14 is a view illustrating a system having a refrigeration cycle in a refrigerator according to a third embodiment, and FIGS. 15 and 16 are flowcharts illustrating a method for controlling the refrigerator according to the third embodiment.

Referring to FIG. 14, a refrigerator 10c according to a third embodiment includes a refrigerant tube 100 for guiding a flow of a refrigerant condensed in a condenser 120, a flow adjusting unit 130 disposed in the refrigerant tube 100 to branch the refrigerant into first and second evaporators 150 and 160, and a plurality of refrigerant passages 201 and 203 extending from an outlet side of the flow adjusting unit 130 to the first and second evaporators 150 and 160.

The plurality of refrigerant passages 201 and 203 may be understood as "branch passages" that are branched from the refrigerant tube 100. The plurality of refrigerant passages 201 and 203 may include a first refrigerant passage 201 connected to the first evaporator 150 and a second refrigerant passage 203 connected to the second evaporator 160.

A plurality of expansion devices 241 and 243 may be disposed in the plurality of refrigerant passages 201 and 203. Each of the plurality of expansion devices 241 and 243 may include a capillary tube. In detail, the plurality of expansion devices 241 and 243 may include a first expansion device 241 disposed in the first refrigerant passage 201 and a second expansion device 243 disposed in the second refrigerant passage 203.

The flow adjusting unit 130 may include a three-way valve having one inflow hole through which the refrigerant is introduced and two discharge holes through which the refrigerant is discharged. The two discharge holes may be connected to the first and second refrigerant passages 201 and 230. The flow adjusting unit 130 may be controlled so that the refrigerant is introduced into the first and second refrigerant passages 201 and 203 at the same time.

The refrigerator 10c may include flow rate adjusting units 251 and 253 for adjusting a flow of the refrigerant. The flow rate adjusting units 251 and 253 may be disposed in at least one refrigerant passage of the first and second refrigerant passages 201 and 203. For example, the flow rate adjusting units 251 and 253 may include a first flow rate adjusting unit 251 disposed in the first refrigerant passage 201 and a second flow rate adjusting unit 253 disposed in the second refrigerant passage 203. Each of the first and second flow rate adjusting units 251 and 253 may include an electric expansion valve (EEV) of which an opened degree is adjustable.

Although the first and second flow rate adjusting units 251 and 253 are respectively disposed at outlet sides of the first and second expansion devices 241 and 243 in FIG. 14, the present disclosure is not limited thereto. For example, the first and second flow rate adjusting units 251 and 253 may be disposed at inlet sides of the first and second expansion devices 241 and 243.

If the degree in which the first or second flow rate adjusting unit 251 or 253 is opened decreases, an amount of refrigerant flowing through the opening having the decreasing opening degree may decrease. On the other hand, if the degree in which the first or second flow rate adjusting unit 251 or 253 increases, an amount of refrigerant flowing through the opening having the increasing opening degree may increase.

For example, if the opening degree of the first flow rate adjusting unit 251 is relatively greater than that of the second flow rate adjusting unit 253, a greater amount of refrigerant may flow into the first refrigerant passage 201. On the other hand, if the opening degree of the second flow rate adjusting unit 253 is relatively greater than that of the first flow rate adjusting unit 251, a greater amount of refrigerant may flow into the second refrigerant passage 203.

Since the first and second flow rate adjusting units 251 and 253 are provided, the degree in which each of the refrigerant passages is opened may be finely adjusted. Thus, an amount of refrigerant to be introduced into the first or second evaporator 150 or 160 may be finely adjustable. As a result, while the first and second evaporators operate, the refrigerant concentration phenomenon into the first or second evaporator 150 or 160 may be prevented.

Although the first and second flow rate adjusting units 251 and 253 are respectively disposed in the first and second refrigerant passages 201 and 203 in FIG. 14, the present disclosure is not limited thereto. For example, in one embodiment, one flow rate adjusting unit may be disposed in either the first or second refrigerant passage 201 or 203.

Since the flow rate adjusting unit is provided in one refrigerant passage to adjust the opening degree, an amount of refrigerant passing through the other refrigerant passage may be relatively adjusted. That is, if the opening degree of the flow rate adjusting unit increases, an amount of refrigerant passing through the other refrigerant passage may decrease. On the other hand, if the opening degree of the flow rate adjusting unit decreases, an amount of refrigerant passing through the other refrigerant passage may increase.

In one embodiment, the flow rate adjusting units 251 and 253 of FIG. 14 may be provided in the plurality of refrigerant passages 101, 103, 105, and 107 described in the first and second embodiments, respectively. In this case, the flow amount of refrigerant may be finely adjusted.

A method for controlling the refrigerator according to the current embodiment will be described with reference to FIGS. 15 and 16. To operate the refrigerator, the first and second compressor 111 and 115 are driven. A refrigeration cycle through the compression-condensation-expansion-evaporation of the refrigerant may operate according to the driving of the first and second compressors 111 and 115 (S111).

Also, the cooling operations of the refrigerating compartment and the freezing compartment may be performed at the same time according to the operation of the refrigeration cycle. To perform the cooling operations of the refrigerating compartment and the freezing compartment at the same time, the flow adjusting unit 130 may be controlled to open the first and second refrigerant passages 101 and 103 (S112, S113). Also, the first and second flow rate adjusting units 251 and 253 may be opened by a preset opening degree (S114).

Inlet and outlet temperatures of the first evaporator 150 may be detected by first inlet and outlet temperature sensors 210 and 220, respectively. Also, inlet and outlet temperatures of the second evaporator 160 may be detected by the second inlet and outlet temperature sensors 230 and 240, respectively (S115, S116).

The control unit 200 may determine an inlet/outlet temperature difference valve of the first evaporator 150 and an inlet/outlet temperature difference valve of the second evaporator 160. Also, the control unit 200 may recognize whether information with respect to the inlet/outlet temperature differences of the first and second evaporators 150 and 160 are within a preset range. The three determination methods will be derived from the descriptions according to the first embodiment.

If it is determined that the refrigerant concentration phenomenon into the first or second evaporator 150 or 160 does not occur through the above-described determination methods, the control state of each of the first and second flow adjusting units 251 and 253 may be maintained (S117, S118). On the other hand, if it is determined that the refrigerant concentration phenomenon occurs in the first or second evaporator 150 or 160, the control state of each of the first and second flow adjusting unit 251 and 253 may be changed (S121).

If the refrigerant concentration phenomenon occurs in the first evaporator 150, at least one of the control of decreasing the opening degree of the first flow rate adjusting unit 251 or the control of increasing the opening degree of the second flow rate adjusting unit 253 may be performed. In this case, an amount of refrigerant introduced into the first evaporator 150 may decrease, and an amount of refrigerant introduced into the second evaporator 160 may increase in order to solve the refrigerant concentration phenomenon in the first evaporator 150 (S122, S123, S124).

If the refrigerant concentration phenomenon occurs in the second evaporator 160, at least one of decreasing the opening degree of the second flow rate adjusting unit 253 or increasing the opening degree of the first flow rate adjusting unit 251 may be performed. In this case, an amount of refrigerant introduced into the second evaporator 160 may decrease, and an amount of refrigerant introduced into the first evaporator 150 may increase to solve the refrigerant concentration phenomenon in the second evaporator 160 (S126, S127, S128).

As described above, when the refrigerant concentration phenomenon occurs in the first or second evaporator 150 or 160, the opening degree of each of the first and second flow rate adjusting units 251 and 253 may be changed to solve the refrigerant concentration phenomenon, and the refrigerating compartment and the freezing compartment may be cooled at the same time (S125).

As described above, since the expansion device and the flow rate adjusting unit are disposed in the inlet-side refrigerant passage of each of the first and second evaporators 150 and 160, and the opening degree of the flow rate adjusting unit is adjusted according to the amount of the refrigerant introduced into the first and second evaporators 150 and 160, the refrigerant concentration phenomenon into one evaporator may be prevented while the plurality of evaporators operate at the same time.

Figure 17:
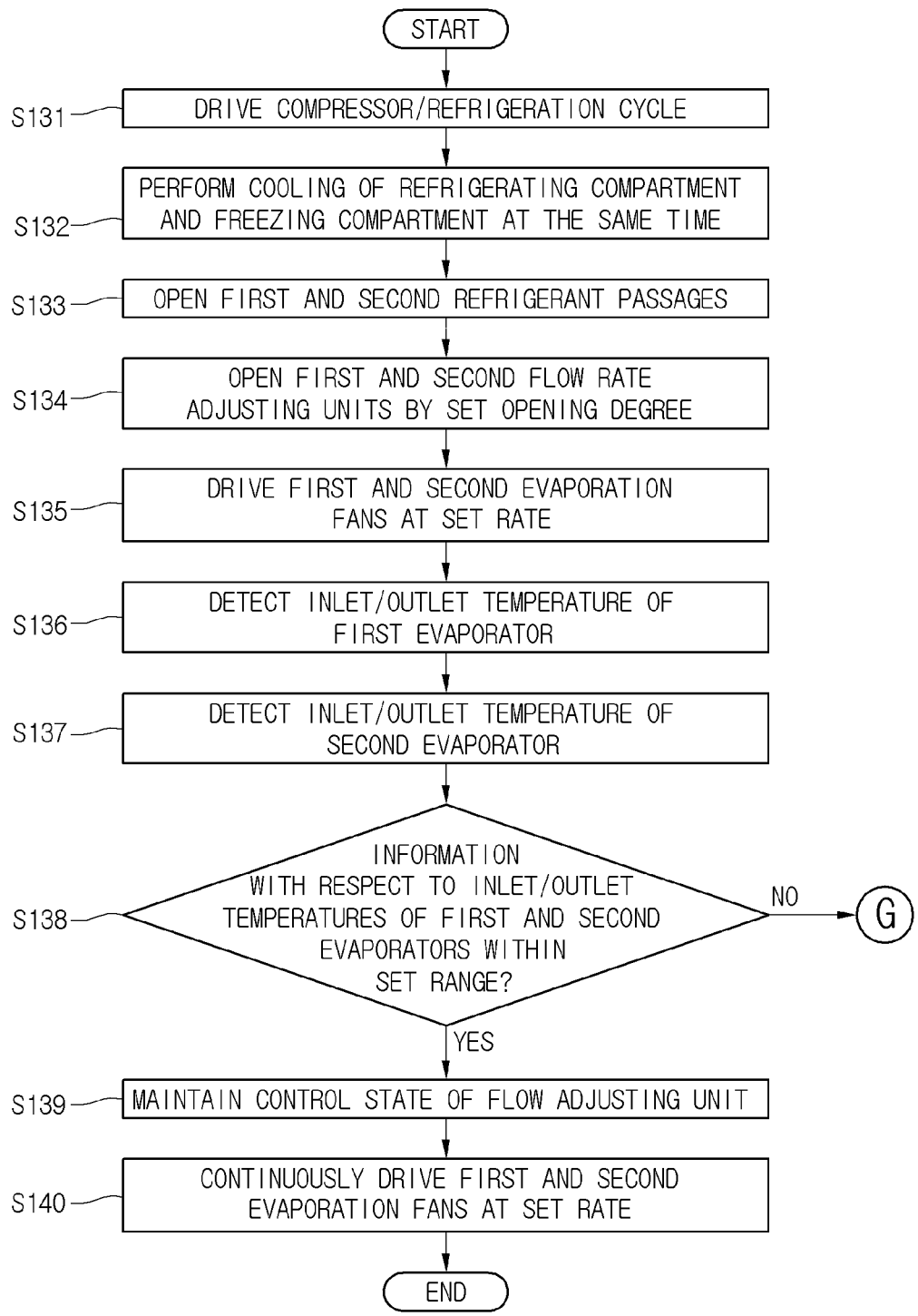
FIGS. 17 and 18 are flowcharts illustrating another example of the method for controlling the refrigerator according to the third embodiment.
Figure 18:
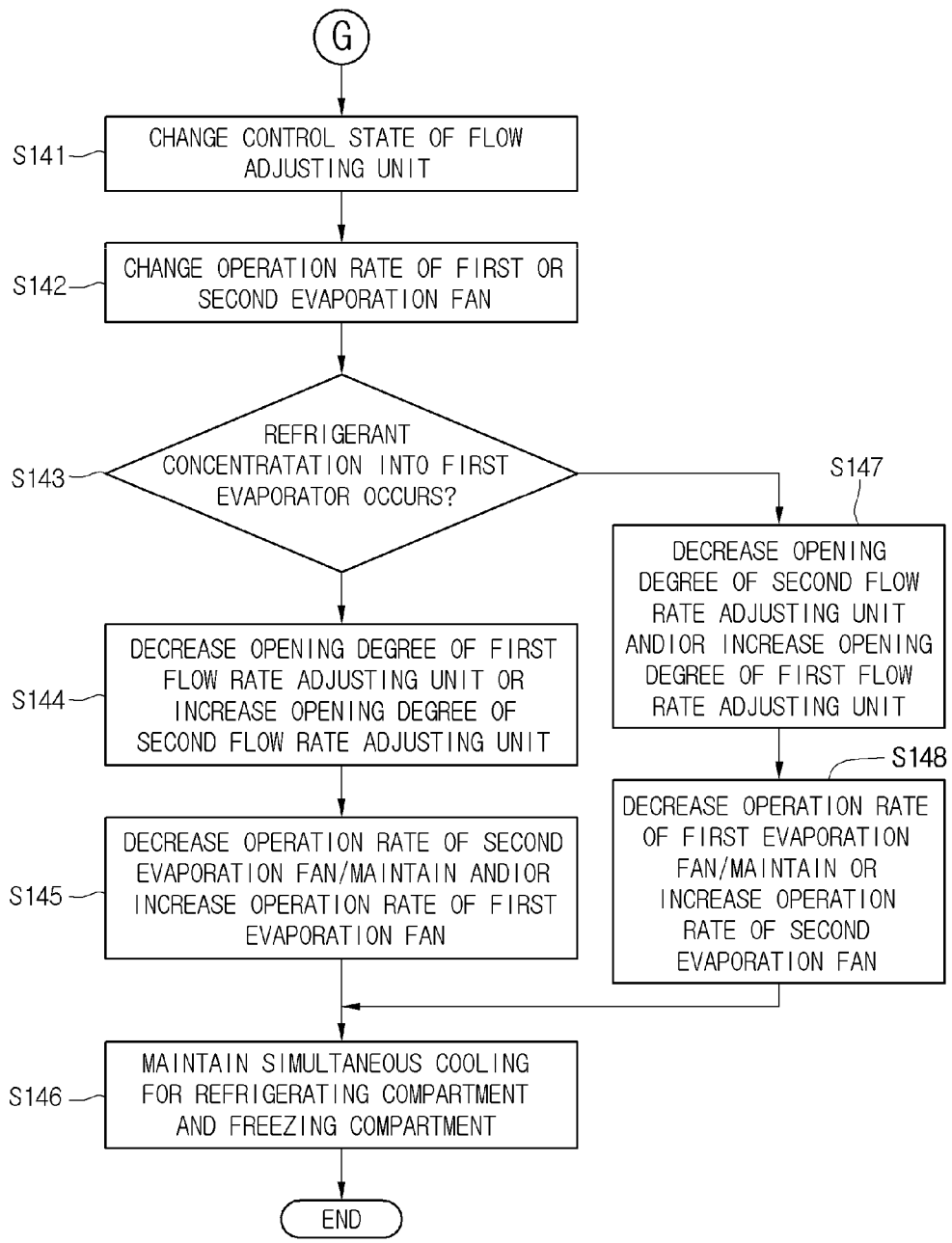

FIGS. 17 and 18 are flowcharts illustrating another example of the method for controlling the refrigerator according to the third embodiment. When the first and second compressor 111 and 115 are driven to operate the refrigerator, a refrigeration cycle through compression-condensation-expansion-evaporation of the refrigerant may operate (S131).

Also, the cooling operations of the refrigerating compartment and the freezing compartment may be performed at the same time according to the operation of the refrigeration cycle. To perform the cooling operations of the refrigerating compartment and the freezing compartment at the same time, the flow adjusting unit 130 may be controlled to open the first and second refrigerant passages 101 and 103 (S132, S133). Also, the first and second flow rate adjusting units 251 and 253 may be opened by a preset opening degree (S134).

While performing the simultaneous cooling operation, the first and second evaporation fans 155 and 165 may operate at the first and second set rates, respectively. Here, the second set rate of the second evaporation fan 165 may be an approximately middle rate, and the first set rate of the first evaporation fan 155 may be an approximately middle rate or a high rate (S135).

Inlet and outlet temperatures of the first evaporator 150 and inlet and outlet temperatures of the second evaporator 160 may be detected (S136, S137). The control unit 200 may recognize whether the refrigerant concentration phenomenon into the first or second evaporator 150 or 160 occurs according to whether information with respect to the inlet/outlet temperature differences of the first and second evaporators 150 and 160 are within a preset range.

If it is determined that the refrigerant concentration phenomenon into the first or second evaporator 150 and 160 does not occur, the control state of the flow adjusting unit 130 may be maintained. That is, the opened state of each of the flow rate adjusting units 251 and 253 may be maintained (S138, S139). Also, the first and second evaporation fans 155 and 165 may continuously operate at the first and second set rates, respectively (S140).

On the other hand, if it is determined that the refrigerant concentration phenomenon occurs in the first or second evaporator 150 or 160, the control state of each of the first and second flow adjusting unit 251 and 253 may be changed. Also, the first or second evaporation fan 155 or 165 may be changed in operation rate (S141, S142).

If the refrigerant concentration phenomenon occurs in the first evaporator 150, at least one of decreasing the opening degree of the first flow rate adjusting unit 251 or the control of increasing the opening degree of the second flow rate adjusting unit 253 may be performed (S143, S144).

Also, the operation rate of the second evaporation fan 165 may be decreased to operate at a rate lower than the second set rate, for example, the low rate. Also, the operation rate of the first evaporation fan 155 may be maintained or increased at the first set rate or operate at a rate higher than the first set rate. For example, the first evaporation fan 155 may operate at the middle or high rate.

When the operation rate of the second evaporation fan 165 is decreased, and the operation rate of the first evaporation fan 155 is maintained or increased, the refrigerant may flow more toward the second evaporator 160 than the first evaporator 150 due to the evaporation pressure difference between the first and second evaporations 150 and 160. Thus, the refrigerant concentration phenomenon into the first evaporator 150 may be reduced (S145).

As a result, an amount of refrigerant introduced into the first evaporator 150 may decrease, and an amount of refrigerant introduced into the second evaporator 160 may increase to solve the refrigerant concentration phenomenon in the first evaporator 150. Also, in addition to the reduced refrigerant concentration phenomenon, the simultaneous cooling operation for the refrigerating compartment and the freezing compartment may be continuously performed (S146).

If the refrigerant concentration phenomenon occurs in the second evaporator 160, at least one of decreasing the opening degree of the second flow rate adjusting unit 253 or increasing the opening degree of the first flow rate adjusting unit 251 may be performed.

Also, the operation rate of the first evaporation fan 155 may be decreased to operate at a rate lower than the first set rate. For example, the first evaporation fan 155 may operate at the low rate. Also, the operation rate of the second evaporation fan 165 may be maintained or increased at the second set rate or at a rate higher than the second set rate. For example, the second evaporation fan 165 may operate at the middle or high rate.

When the operation rate of the first evaporation fan 155 is decreased and the operation rate of the second evaporation fan 165 is maintained or increased, the refrigerant passing through the flow adjusting unit 130 may flow more toward the first evaporator 150 than the second evaporator 160 due to the evaporation pressure difference between the first and second evaporations 150 and 160. Thus, the refrigerant concentration phenomenon into the second evaporator 150 may be reduced (S148).

As described above, when the refrigerant concentration phenomenon occurs in the first or second evaporator 150 or 160, the opening degree of each of the first and second flow rate adjusting units 251 and 253 and the operation rate of each of the first and second evaporation fans 155 and 165 may be changed to solve the refrigerant concentration phenomenon, and refrigerating compartment and the freezing compartment may be cooled at the same time.

Figure 19:
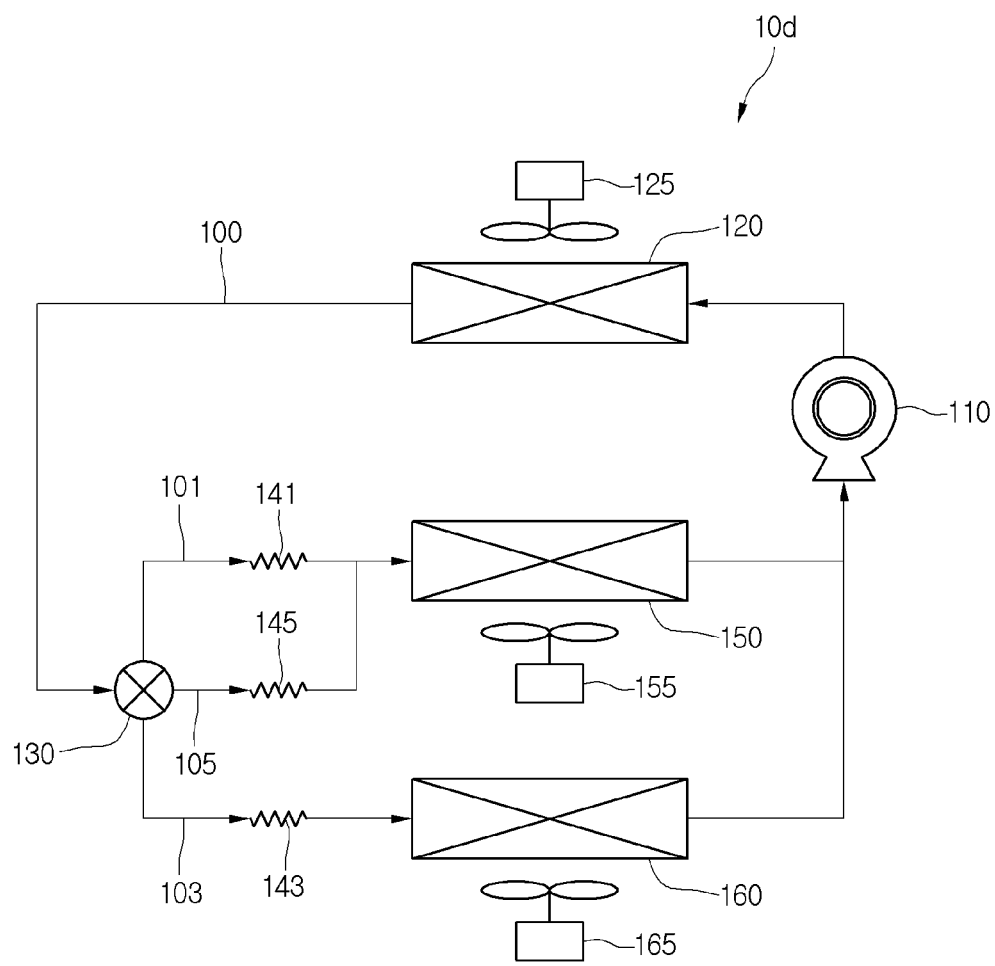
FIG. 19 is a view illustrating a system having a refrigeration cycle in a refrigerator according to a fourth embodiment.

FIG. 19 is a view illustrating a system having a refrigeration cycle in a refrigerator according to a fourth embodiment. A refrigerator 10*d* may include a plurality of devices for driving a refrigeration cycle. In detail, the refrigerator 10*d* may include one compressor 110 for compressing a refrigerant, a condenser 120 for condensing the refrigerant compressed in the compressor 110, a plurality of expansion devices 141, 143, and 145 for decompressing the refrigerant condensed in the condenser 120, and first and second evaporators 150 and 160 for evaporating the refrigerant decompressed in the plurality of expansion devices 141, 143, and 145.

This embodiment is different from the first embodiment of FIG. 1 in that one compressor 110 is provided to outlet sides of the plurality of evaporators 150 and 160. A refrigerant evaporated in the first evaporator 150 and a refrigerant evaporated in the second evaporator 160 may be mixed with each other, and then the mixture may be suctioned into the one compressor 110 and compressed.

Figure 20:
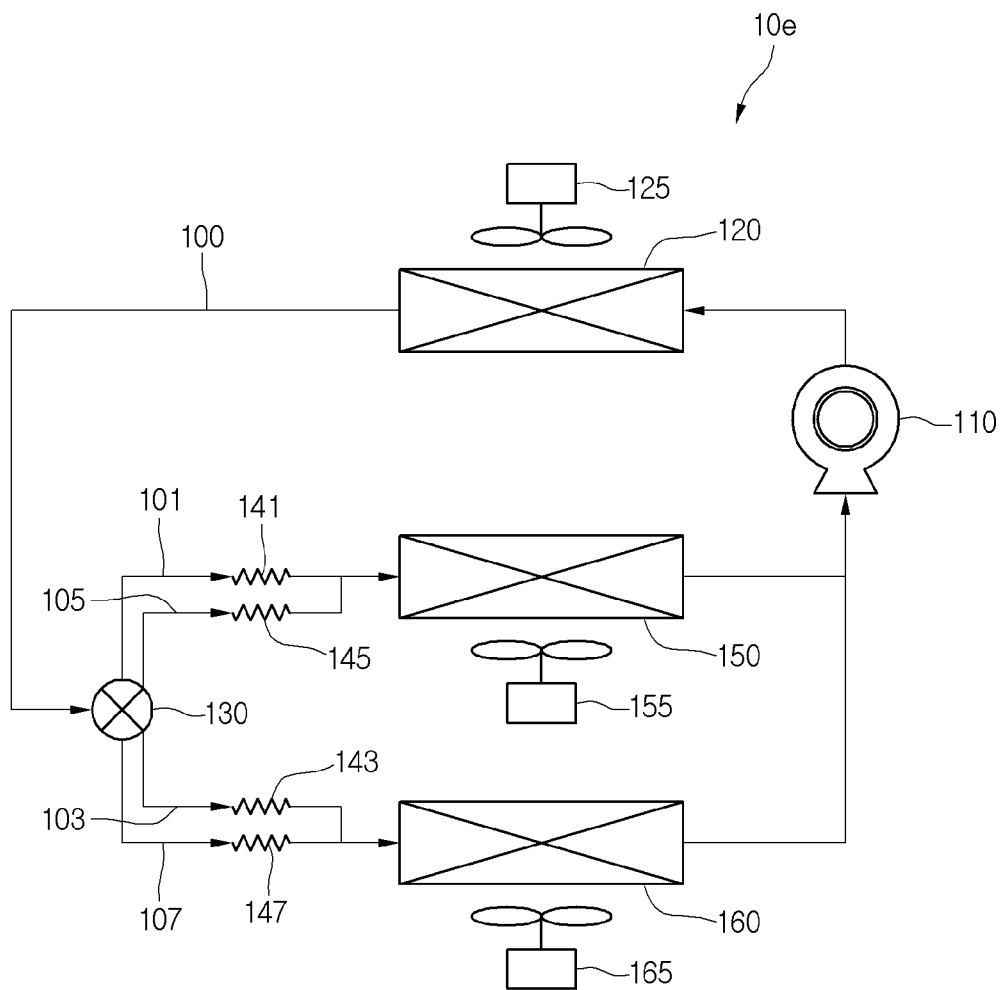
FIG. 20 is a view illustrating a system having a refrigeration cycle in a refrigerator according to a fifth embodiment.

FIG. 20 is a view illustrating a system having a refrigeration cycle in a refrigerator according to a fifth embodiment. A refrigerator 10*e* may include a plurality of devices for driving a refrigeration cycle. In detail, the refrigerator 10*e* may include a refrigerant tube 100 for guiding a flow of a refrigerant condensed in a condenser 120, a flow adjusting unit 130 disposed in the refrigerant tube 100 to branch the refrigerant into first and second evaporators 150 and 160, and a plurality of refrigerant passages 101, 103, 105, and 107 extending from an outlet side of the flow adjusting unit 130 to the first and second evaporators 150 and 160.

The plurality of refrigerant passages 101, 103, 105, and 107 may be understood as "branch passages" that are branched from the refrigerant tube 100. The plurality of refrigerant passages 101, 103, 105, and 107 may include first and third refrigerant passages 101 and 103 connected to the first evaporator 150 and second and fourth refrigerant passages 103 and 107 connected to the second evaporator 160.

This embodiment is different from the second embodiment of FIG. 9 in that one compressor 110 is provided to outlet sides of the plurality of evaporators 150 and 160. A refrigerant evaporated in the first evaporator 150 and a refrigerant evaporated in the second evaporator 160 may be mixed with each other, and then the mixture may be suctioned into the one compressor 110 and compressed.

Figure 21:
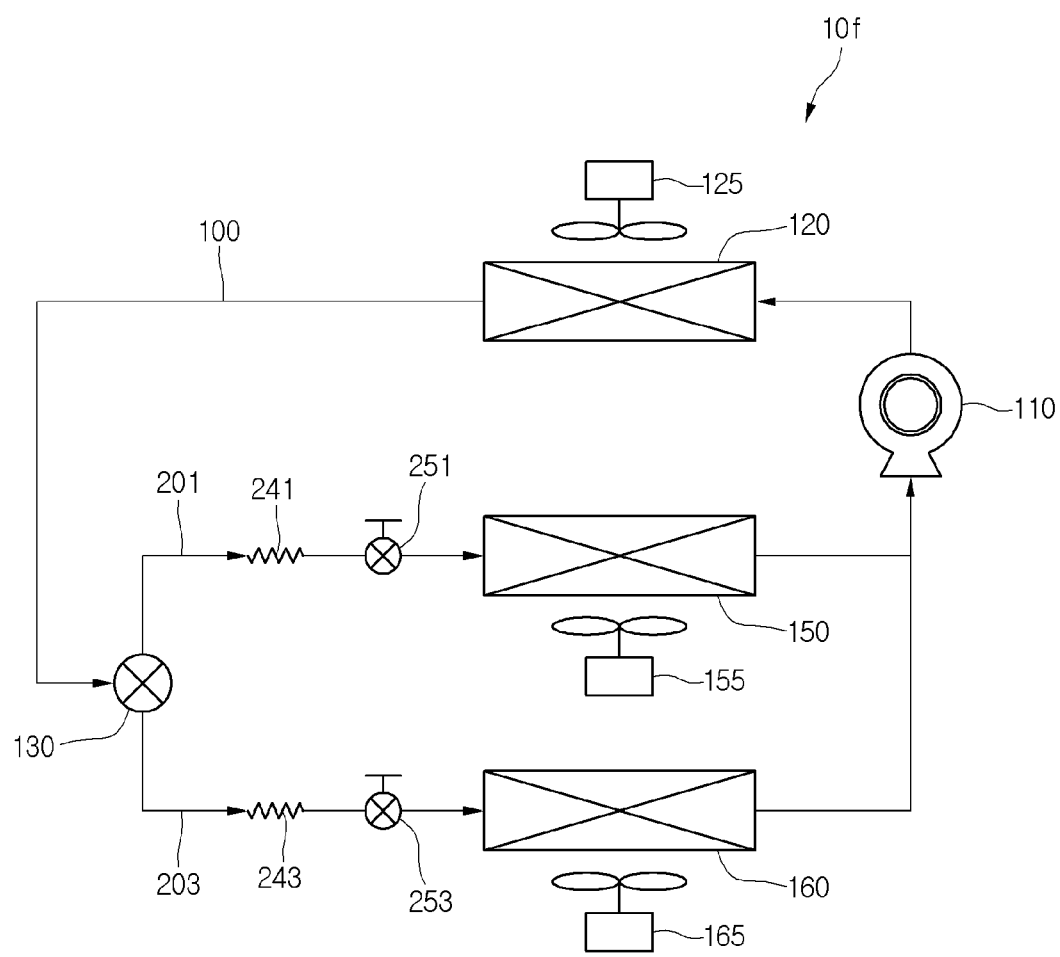
FIG. 21 is a view illustrating a system having a refrigeration cycle in a refrigerator according to a sixth embodiment.

FIG. 21 is a view illustrating a system having a refrigeration cycle in a refrigerator according to a sixth embodiment. A refrigerator 10*f* may include a refrigerant tube 100 for guiding a flow of a refrigerant condensed in a condenser 120, a flow adjusting unit 130 disposed in the refrigerant tube 100 to branch the refrigerant into first and second evaporators 150 and 160, and a plurality of refrigerant passages 201 and 203 extending from an outlet side of the flow adjusting unit 130 to the first and second evaporators 150 and 160.

The plurality of refrigerant passages 201 and 203 may be understood as "branch passages" that are branched from the refrigerant tube 100. The plurality of refrigerant passages 201 and 203 may include a first refrigerant passage 201 connected to the first evaporator 150 and a second refrigerant passage 203 connected to the second evaporator 160.

The refrigerator 10*f* may include a first expansion device 241 and a first flow rate adjusting unit 251, which are disposed in the first refrigerant passage 201 and a second expansion device 243 and a second flow rate adjusting unit 253 which are disposed in the second refrigerant passage 203.

This embodiment is different from the third embodiment of FIG. 14 in that one compressor 110 is provided to outlet sides of the plurality of evaporators 150 and 160. A refrigerant evaporated in the first evaporator 150 and a refrigerant evaporated in the second evaporator 160 may be mixed with each other, and then the mixture may be suctioned into the one compressor 110 and compressed.

According to the proposed embodiments, since the plurality of evaporators operate at the same time, the plurality of storage compartments may be effectively cooled. Particularly, the plurality of refrigerant passages may be provided at the inlet side of at least one evaporator of the plurality of evaporators, and the expansion device may be provided in each of the refrigerant passage to control the flow of the refrigerant.

Also, since a flow rate of the refrigerant introduced into the evaporator is determined on the basis of the inlet/outlet temperatures of the evaporator, and the flow adjusting unit is controlled according to the excess or leakage of the refrigerant, the refrigerant may be effectively distributed into the plurality of evaporators. Therefore, the refrigerant concentration phenomenon into one evaporator of the plurality of evaporators may be prevented, and even through the refrigerant concentration phenomenon into a specific evaporator occurs, the refrigerant may be uniformly distributed. Also, since the flow rate adjusting unit of which an opening degree is adjustable is provided in the plurality of refrigerant passages, the flow rate of the refrigerant may be accurately controlled.

Also, in the case where the plurality of compressors are provided in the refrigerator, i.e., the high-pressure side compressor and the low-pressure side compressor are provided, the refrigerant flow resistance of the inlet side of the high-pressure evaporator is less than that of the inlet side of the low-pressure evaporator to prevent the refrigerant from being concentrated into the low-pressure evaporator.

Also, if it is determined that the refrigerant is concentrated into a specific evaporator, the rotation number (e.g., speed or rate) of the evaporation fan provided on a side of each of the evaporators may be adjusted to uniformly distribute the refrigerant. Particularly, the rotation number of the evaporation fan in which the refrigerant flow is less may relatively decrease, and the rotation number of the evaporation fan in which the refrigerant concentration phenomenon occurs may relatively increase to prevent the refrigerant from being concentrated into one side.

Also, since the rotation number of the evaporation fan is adequately adjusted according to whether the refrigerant concentration phenomenon occurs, the fan operation input may be reduced, and thus, power consumption may be reduced when compared to a case in which the evaporation fan rotates at the same rotation number. Also, since the flow rate adjusting unit of which an opening degree is adjustable is provided in the plurality of refrigerant passages, the flow rate of the refrigerant may be accurately controlled.

As broadly described herein, embodiments provide a refrigerator that is capable of efficiently cooling a plurality of storage compartments. In one embodiment, a refrigerator may include: a compressor compressing a refrigerant; a condenser condensing the refrigerant compressed in the compressor; a refrigerant tube guiding a flow of the refrigerant condensed in the condenser; a plurality of expansion devices decompressing the refrigerant condensed in the condenser; a plurality of evaporators including first and second evaporators to evaporate the refrigerant decompressed in the plurality of expansion devices; a plurality of first evaporation passages in which a portion of the plurality of expansion devices is disposed, the plurality of first evaporation passages guiding introduction of the refrigerant into the first evaporator of the plurality of evaporators; a second evaporation passage in which the other portion of the plurality of expansion devices is disposed, the second evaporation passage guiding introduction of the refrigerant into the second evaporator of the plurality of evaporators; and a flow adjusting unit disposed in the refrigerant tube to branch the refrigerant into the plurality of first evaporation passages and the second evaporation passage.

The flow adjusting unit may include a four-way valve having one inflow hole and three discharge holes. The second evaporation passage may be provided in plurality, and the flow adjusting unit may include a five-way valve having one inflow hole and four discharge holes. An electronic expansion valve of which an opening degree is adjustable may be disposed in the first or second evaporation passage. At least one of the plurality of expansion devices may include a capillary tube.

The refrigerator may further include a plurality of temperature sensors for detecting inlet and outlet temperatures of the first and second evaporators, and a control unit adjusting an amount of refrigerant passing through at least one refrigerant passage of the plurality of refrigerant passages on the basis of information with respect to the refrigerant inlet/outlet temperatures of the first evaporator and information with respect to the refrigerant inlet/outlet temperatures of the second evaporator.

The control unit may control the amount of refrigerant on the basis of whether a refrigerant inlet/outlet temperature difference of the first evaporator is equal to or greater than a reference value, whether a ratio of the refrigerant inlet/outlet temperature difference of the first evaporator to a refrigerant inlet/outlet temperature difference of the second evaporator is equal to or greater than a first set value, or whether a difference value between the refrigerant inlet/outlet temperature difference of the first evaporator and the refrigerant inlet/outlet temperature difference of the second evaporator is equal to or greater than a second set value.

The refrigerator may further include first and second evaporation fans that are respectively disposed on one sides of the first and second evaporators, wherein the control unit may change a rotation number (or rate) of the first or second evaporation fan on the basis of the information with respect to the refrigerant inlet/outlet temperatures of the first and second evaporators. When refrigerant concentration into the first evaporator is determined, the control unit may decrease the rotation number of the second evaporation fan or increase or maintain the rotation number of the first evaporation fan.

The compressor may include a first compressor and a second compressor, and the refrigerant compressed in the second compressor may be mixed with the refrigerant evaporated in the first evaporator, and the mixture may be suctioned into the first compressor.

The refrigerator may further include a refrigerating compartment and a freezing compartment as storage compartments, wherein the first evaporator may be disposed on a side of the storage compartment, which has a relatively large cooling load and capacity, of the refrigerating compartment and the freezing compartment, and the second evaporator may be disposed on a side of the storage compartment, which has a relatively small cooling load and capacity, of the refrigerating compartment and the freezing compartment.

In another embodiment, a method of controlling a refrigerator may include: driving a compressor to drive a refrigeration cycle including a first evaporator and a second evaporator; supplying cool air into a refrigerating compartment and a freezing compartment at the same time according to the driving of the refrigeration cycle; recognizing whether a refrigerant is concentrated into the first evaporator or the second evaporator; and reducing a flow rate of the refrigerant into the evaporator in which the refrigerant is concentrated.

The recognizing of whether the refrigerant is concentrated into the first evaporator or the second evaporator may include detecting an inlet temperature and an outlet temperature of the first evaporator, and detecting an inlet temperature and an outlet temperature of the second evaporator.

The recognizing of whether the refrigerant is concentrated into the first evaporator or the second evaporator may include recognizing whether at least one of information with respect to an inlet/outlet temperature difference of the first evaporator and information with respect to an inlet/outlet temperature difference of the second evaporator belongs to a set range.

The recognizing of whether the refrigerant is concentrated into the first evaporator or the second evaporator may include recognizing whether the inlet/outlet temperature difference of the first evaporator is equal to a reference value or is greater or less than the reference value.

The recognizing of whether the refrigerant is concentrated into the first evaporator or the second evaporator may include recognizing whether a ratio of the inlet/outlet temperature difference of the first evaporator to the inlet/outlet temperature difference of the second evaporator is equal to a first set value or is greater or less than the first set value.

The recognizing of whether the refrigerant is concentrated into the first evaporator or the second evaporator may include recognizing whether a difference value between the inlet/outlet temperature difference of the first evaporator and the inlet/outlet temperature difference of the second evaporator is equal to a second set value or is greater or less than the second set value.

The refrigerant may include first and third refrigerant passages for introducing the refrigerant into the first evaporator and a second refrigerant passage for introducing the refrigerant into the second evaporator, and when the refrigerant is concentrated into the first evaporator, the first or third refrigerant passage may be closed, and the second refrigerant passage may be opened.

The refrigerator may include first and third refrigerant passages for introducing the refrigerant into the first evaporator and second and fourth refrigerant passages for introducing the refrigerant into the second evaporator, and when the refrigerant is concentrated into the first evaporator, the first or third refrigerant passage may be closed, and the second and fourth refrigerant passages may be opened.

The refrigerator may include a first refrigerant passage for introducing the refrigerant into the first evaporator and a second refrigerant passage for introducing the refrigerant into the second evaporator and a flow rate adjusting unit disposed in the second refrigerant passage, and when the refrigerant is concentrated into the first evaporator, an opening degree of the second refrigerant passage may increase.

The method may further include changing an operation rate of the first or second evaporation fan when the refrigerant is concentrated into the first or second evaporator. The refrigerant may be branched into the first and second evaporators to flow, and the changing of the operation rate may include when the refrigerant is concentrated into the first evaporator, reducing the operation rate of the second evaporator fan, and maintaining or increasing the operation rate of the first evaporation fan.

Operating each of the first and second evaporation fans at a set rate may include operating the first evaporation fan at a middle or high rate, and operating the second evaporation fan at a middle rate. When the refrigerant is concentrated into the first evaporator, the operation rate of the second evaporation fan may be reduced to a low rate, and the operation rate of the first evaporation fan may be maintained to the middle or high rate.

Any reference in this specification to "one embodiment," "an embodiment," "example embodiment," etc., means that a particular feature, structure, or characteristic described in connection with the embodiment is included in at least one embodiment of the invention. The appearances of such phrases in various places in the specification are not necessarily all referring to the same embodiment. Further, when a particular feature, structure, or characteristic is described in connection with any embodiment, it is submitted that it is within the purview of one skilled in the art to effect such feature, structure, or characteristic in connection with other ones of the embodiments.

Although embodiments have been described with reference to a number of illustrative embodiments thereof, it should be understood that numerous other modifications and embodiments can be devised by those skilled in the art that will fall within the spirit and scope of the principles of this disclosure. More particularly, various variations and modifications are possible in the component parts and/or arrangements of the subject combination arrangement within the scope of the disclosure, the drawings and the appended claims. In addition to variations and modifications in the component parts and/or arrangements, alternative uses will also be apparent to those skilled in the art.

What is claimed is:

1. A refrigerator comprising:
    a compressor configured to compress refrigerant;
    a condenser configured to condense the refrigerant compressed in the compressor;
    a refrigerant tube that guides a flow of the refrigerant condensed in the condenser;
    a plurality of expansion devices configured to decompress the refrigerant condensed in the condenser;
    a plurality of evaporators including a first evaporator and a second evaporator to evaporate the refrigerant decompressed in the plurality of expansion devices;
    first and second evaporation fans that are disposed corresponding to the first and second evaporators, respectively;
    a plurality of first evaporation passages in which at least one of the plurality of expansion devices is disposed, the plurality of first evaporation passages including a first refrigerant passage and a third refrigerant passage to guide the refrigerant into the first evaporator among the plurality of evaporators;
    a second evaporation passage in which remaining ones of the plurality of expansion device is disposed, the second evaporation passage including a second refrigerant passage to guide the refrigerant into the second evaporator among the plurality of evaporators; and
    a flow adjusting device disposed in the refrigerant tube to branch the refrigerant into the first refrigerant passage and the third refrigerant passage, and the second evaporation passage;
    a plurality of temperature sensors that detects inlet and outlet temperatures of the refrigerant that flows through the first evaporator and the second evaporator; and
    a controller that is configured to determine:
        a concentration of refrigerant in the second evaporator when the inlet/outlet temperature difference of the first evaporator is greater than that of the second evaporator; and
        a concentration of refrigerant in the first evaporator when the inlet/outlet temperature difference or the first evaporator is less than that of the second evaporator,
    wherein the controller is configured to control the flow adjusting device such that the first, the second and the third refrigerant passages are opened and controls to decrease a rotation rate of the first evaporation fan and to increase a rotation rate of the second evaporation fan when the controller determines the concentration of refrigerant in the second evaporator, and wherein the controller is configured to control the flow adjusting device such that the first and the second passages are opened and the third refrigerant passage is closed and controls to decrease the rotation rate of the second evaporation fan and to increase the rotation rate of the first evaporation fan when the controller determines the concentration of refrigerant in the first evaporator.

2. The refrigerator according to claim 1, wherein the flow adjusting device comprises a four-way valve having one inflow part and three discharge parts.

3. The refrigerator according to claim 2, wherein the second evaporation passage includes a fourth refrigerant passage, and the flow adjusting device comprises a five-way valve having one inflow part and four discharge parts.

4. The refrigerator according to claim 1, wherein at least one of the plurality of expansion devices comprises a capillary tube.

5. The refrigerator according to claim 1, wherein the controller controls the amount of refrigerant that flows through the first and second evaporators on the basis of whether a refrigerant inlet/outlet temperature difference of the first evaporator is equal to, greater than, or less than a reference value, whether a ratio of the refrigerant inlet/outlet temperature difference of the first evaporator to a refrigerant inlet/outlet temperature difference of the second evaporator is equal to, greater than, or less than a first set value, or whether a difference value between the refrigerant inlet/outlet temperature difference of the first evaporator and the refrigerant inlet/outlet temperature difference of the second evaporator is equal to, greater than, or less than a second set value.

6. The refrigerator according to claim 1, wherein the compressor comprises a first compressor and a second compressor, and the refrigerant compressed in the second compressor is mixed with the refrigerant evaporated in the first evaporator, and the mixture is suctioned into the first compressor.

7. The refrigerator according to claim 1, further comprising storage compartments having a refrigerating compartment and a freezing compartment, wherein the first evaporator is disposed on a side of the refrigerating compartment or the freezing compartment that has a greater cooling load and capacity, and the second evaporator is disposed on a side of the refrigerating compartment or the freezing compartment that has a smaller cooling load and capacity.

* * * * *